Feb. 13, 1962   J. W. DODSWORTH   3,021,054
PROGRAM CONTROL FOR ACCOUNTING MACHINE
Original Filed Sept. 11, 1958   21 Sheets-Sheet 1

INVENTOR.
JAMES W. DODSWORTH
BY
AGENT

Feb. 13, 1962  J. W. DODSWORTH  3,021,054
PROGRAM CONTROL FOR ACCOUNTING MACHINE
Original Filed Sept. 11, 1958  21 Sheets-Sheet 2
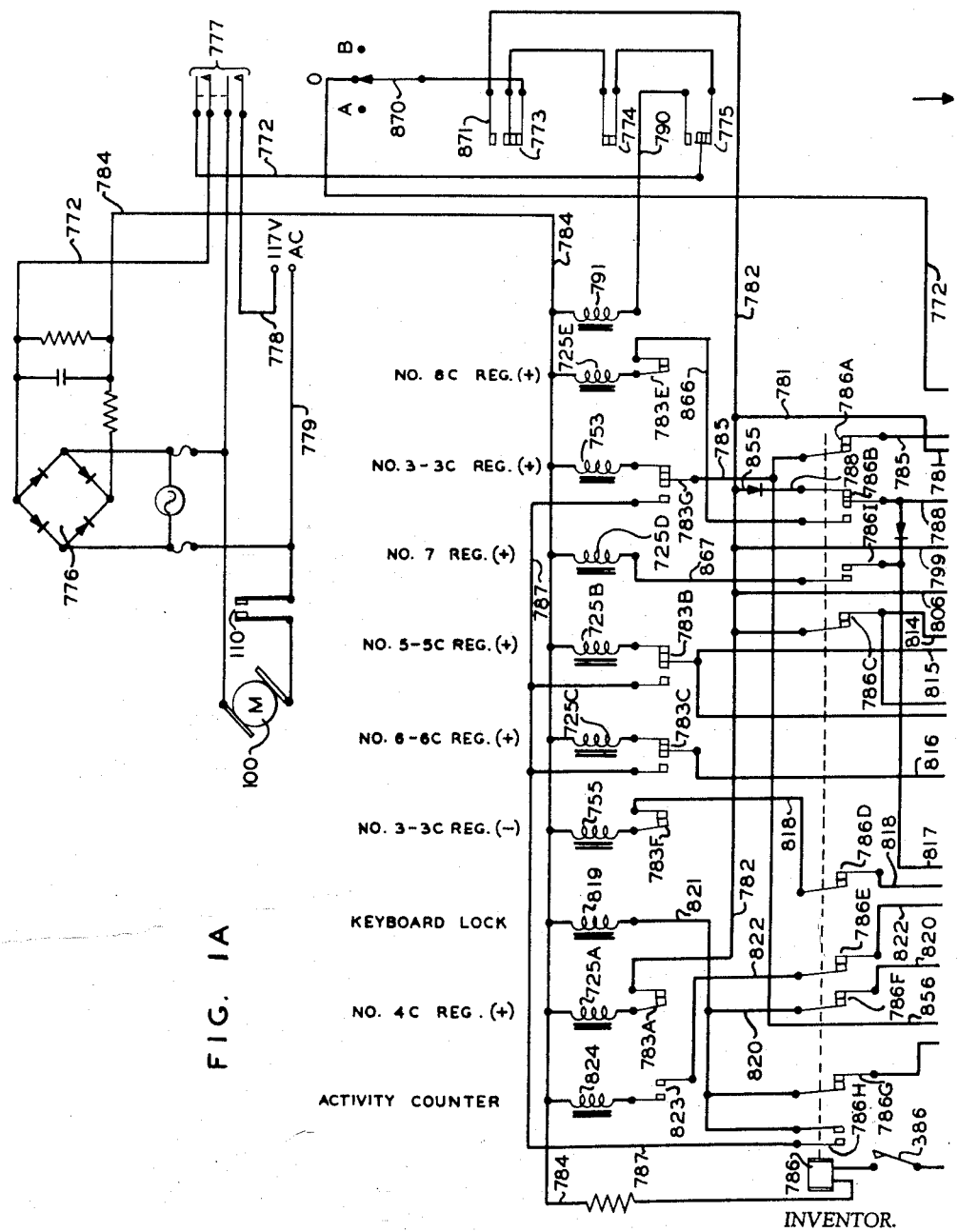
FIG. IA
INVENTOR.
JAMES W. DODSWORTH
BY *Elmer W Edwards*
AGENT Feb. 13, 1962  J. W. DODSWORTH  3,021,054
PROGRAM CONTROL FOR ACCOUNTING MACHINE
Original Filed Sept. 11, 1958  21 Sheets-Sheet 3

INVENTOR.
JAMES W. DODSWORTH
BY Elmer W Edwards
AGENT

Feb. 13, 1962  J. W. DODSWORTH  3,021,054
PROGRAM CONTROL FOR ACCOUNTING MACHINE
Original Filed Sept. 11, 1958  21 Sheets-Sheet 4

INVENTOR.
JAMES W. DODSWORTH
BY Elmer W. Edwards
AGENT

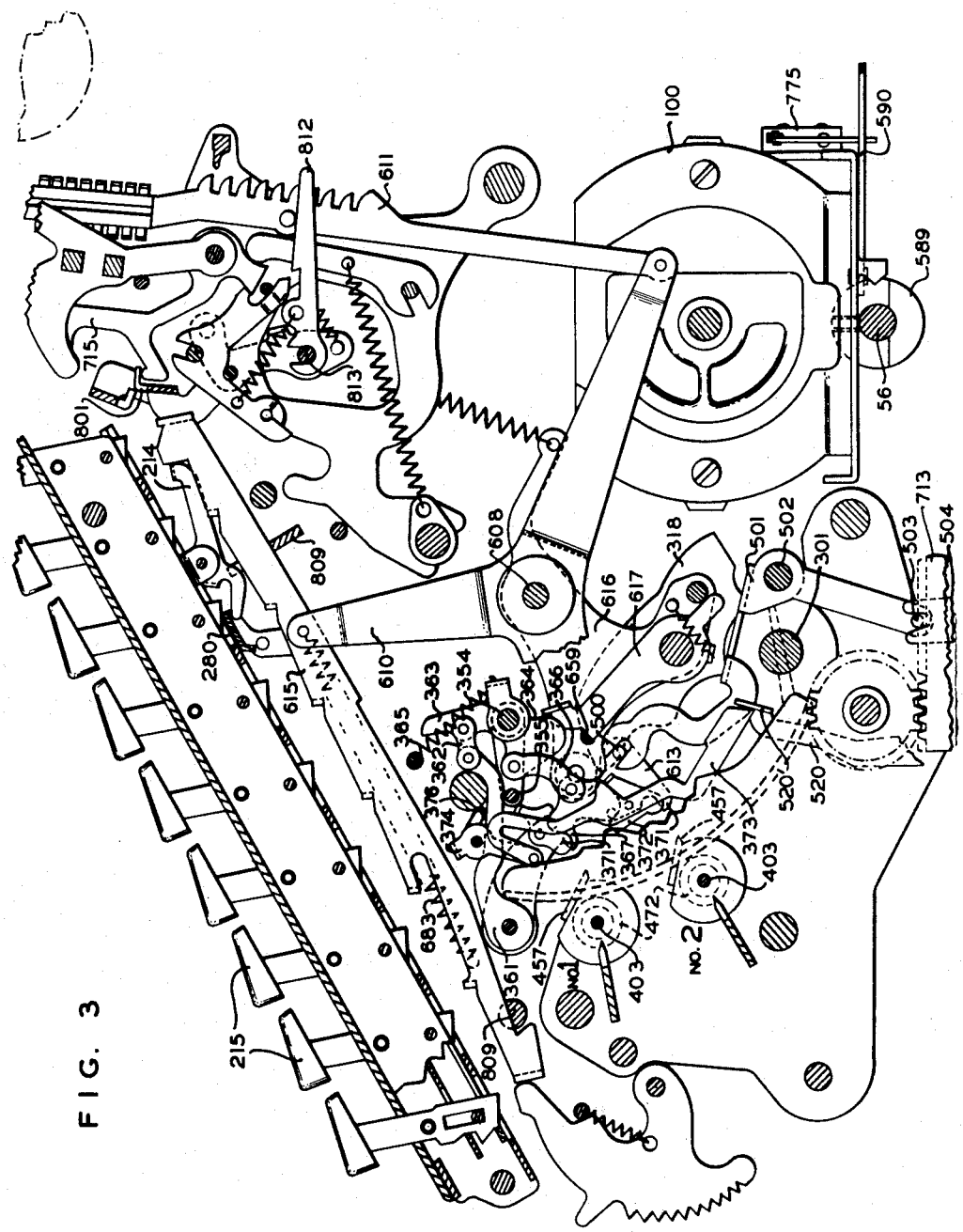

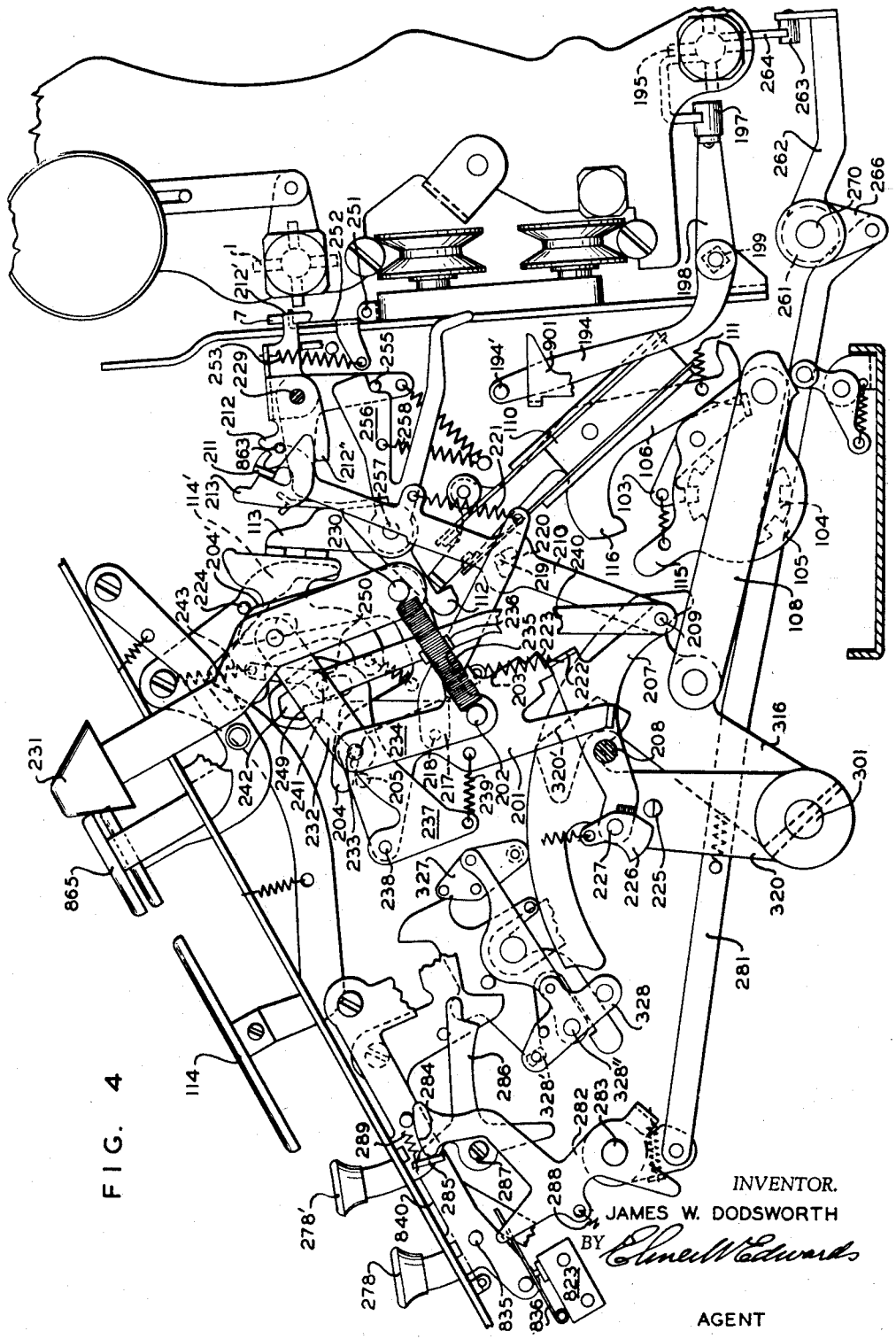

Feb. 13, 1962 J. W. DODSWORTH 3,021,054
PROGRAM CONTROL FOR ACCOUNTING MACHINE
Original Filed Sept. 11, 1958 21 Sheets-Sheet 7
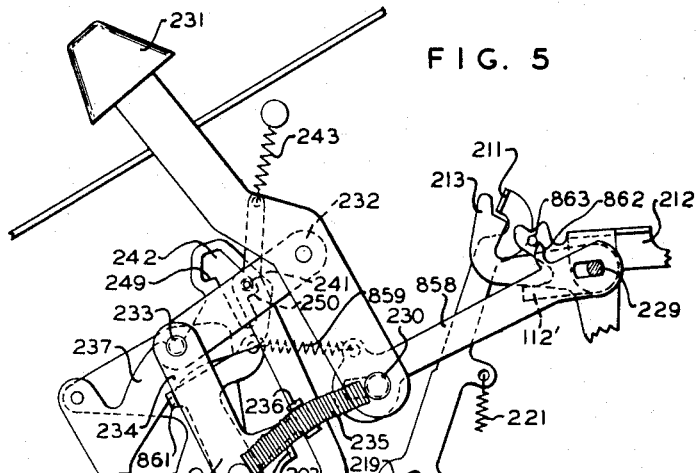
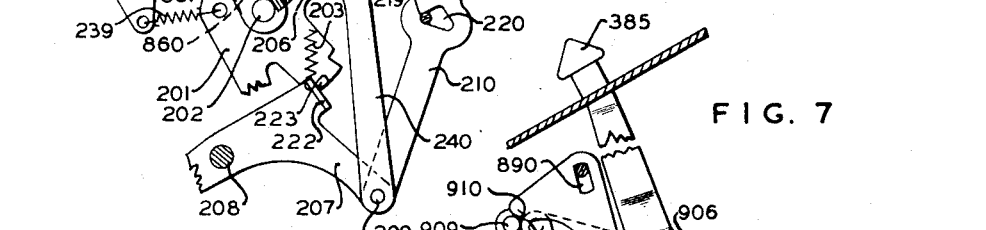
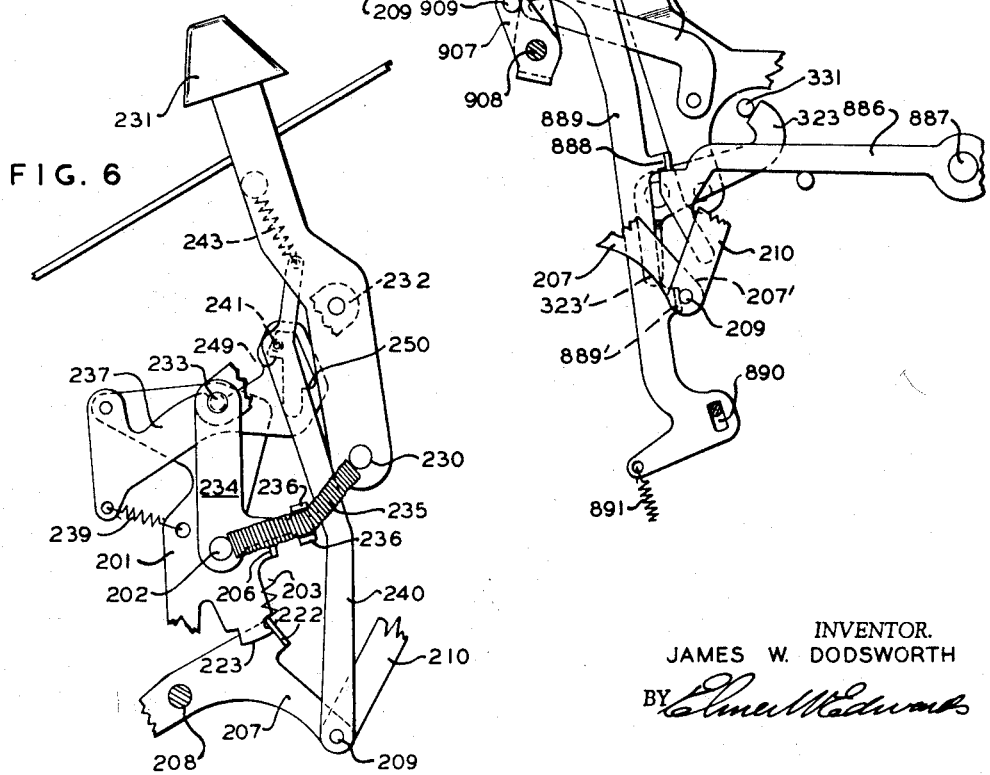
INVENTOR.
JAMES W. DODSWORTH
AGENT

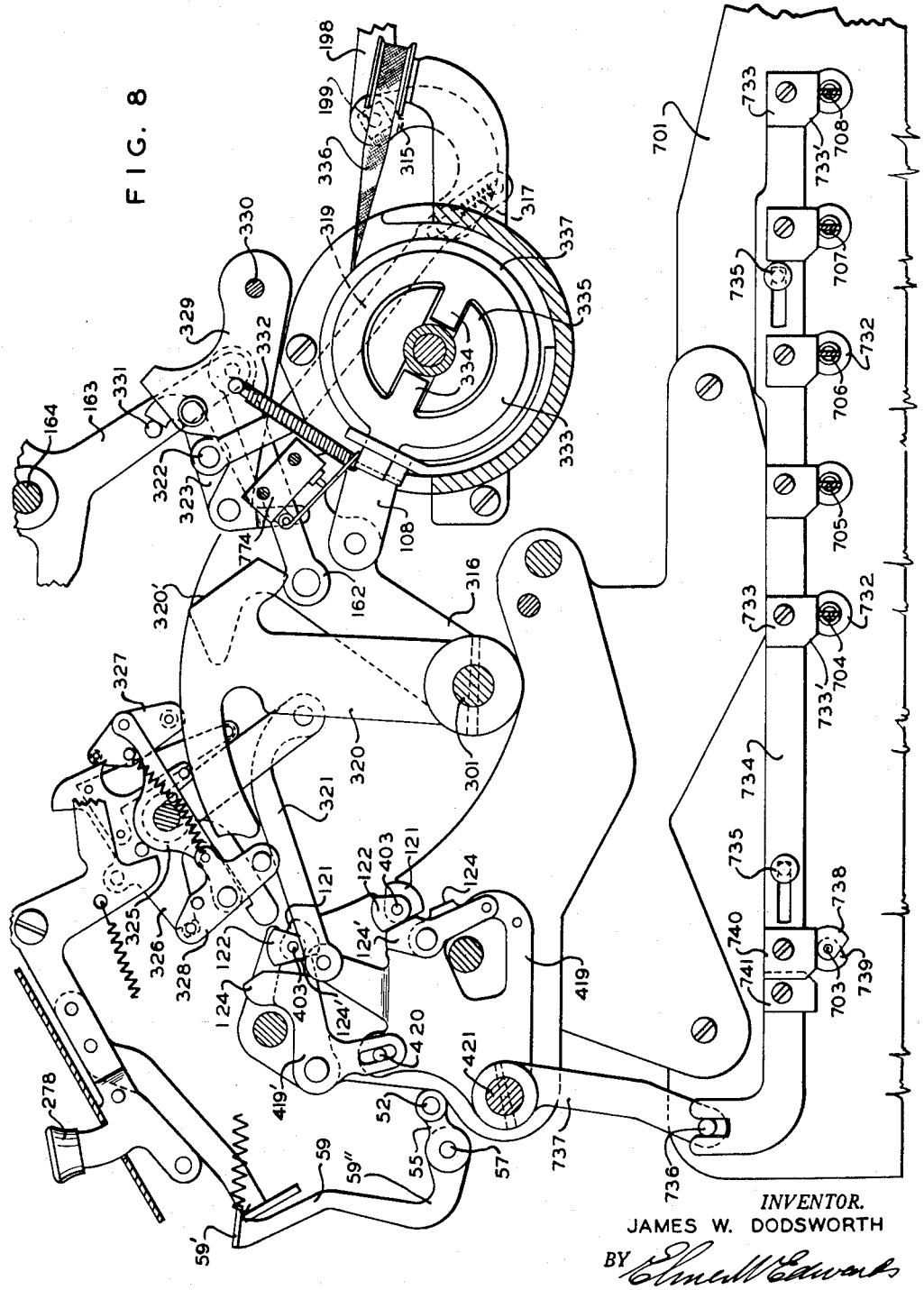

Feb. 13, 1962  J. W. DODSWORTH  3,021,054
PROGRAM CONTROL FOR ACCOUNTING MACHINE
Original Filed Sept. 11, 1958  21 Sheets-Sheet 9
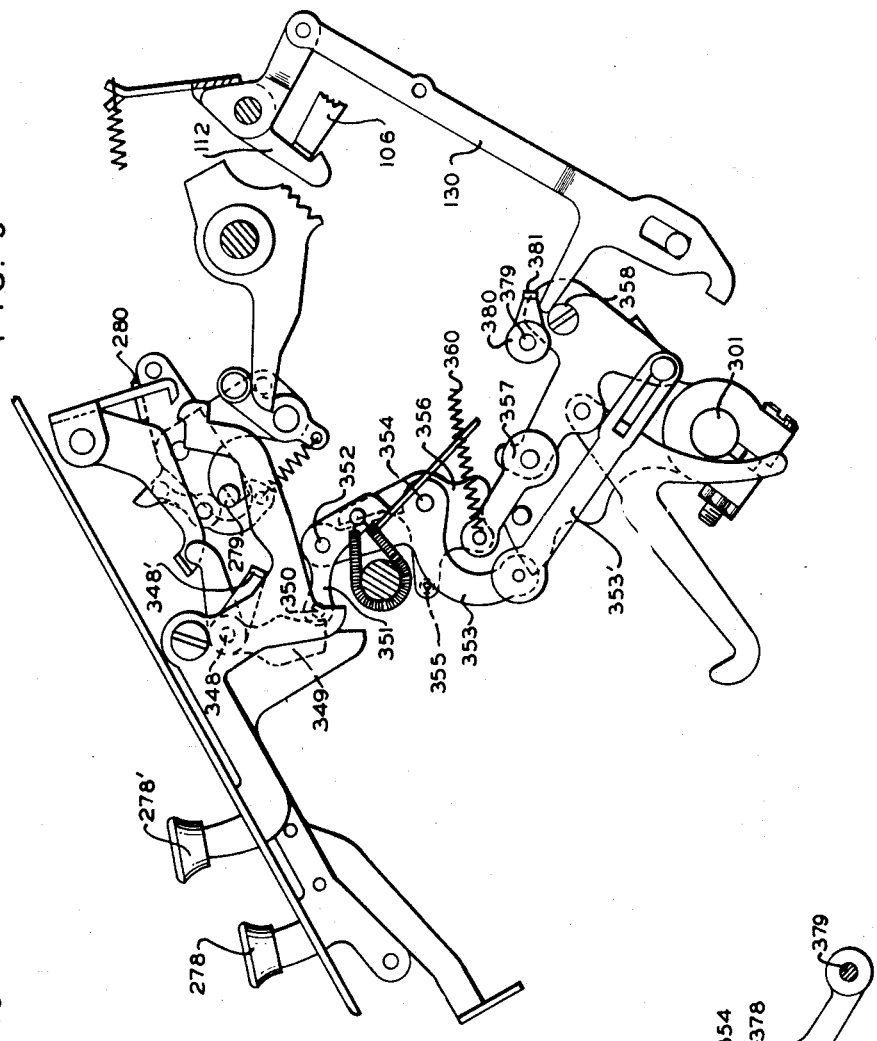
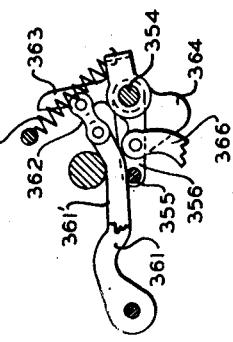
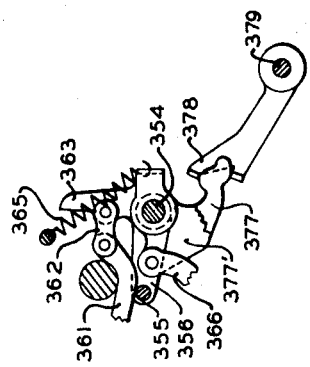
INVENTOR.
JAMES W. DODSWORTH
BY Elmer W. Edwards
AGENT

FIG. 12

Feb. 13, 1962 J. W. DODSWORTH 3,021,054
PROGRAM CONTROL FOR ACCOUNTING MACHINE
Original Filed Sept. 11, 1958 21 Sheets-Sheet 11

INVENTOR.
JAMES W. DODSWORTH

BY *Elmer W. Edwards*

AGENT

Feb. 13, 1962 J. W. DODSWORTH 3,021,054
PROGRAM CONTROL FOR ACCOUNTING MACHINE
Original Filed Sept. 11, 1958 21 Sheets-Sheet 12

INVENTOR.
JAMES W. DODSWORTH
BY *Elmer W Edwards*
AGENT

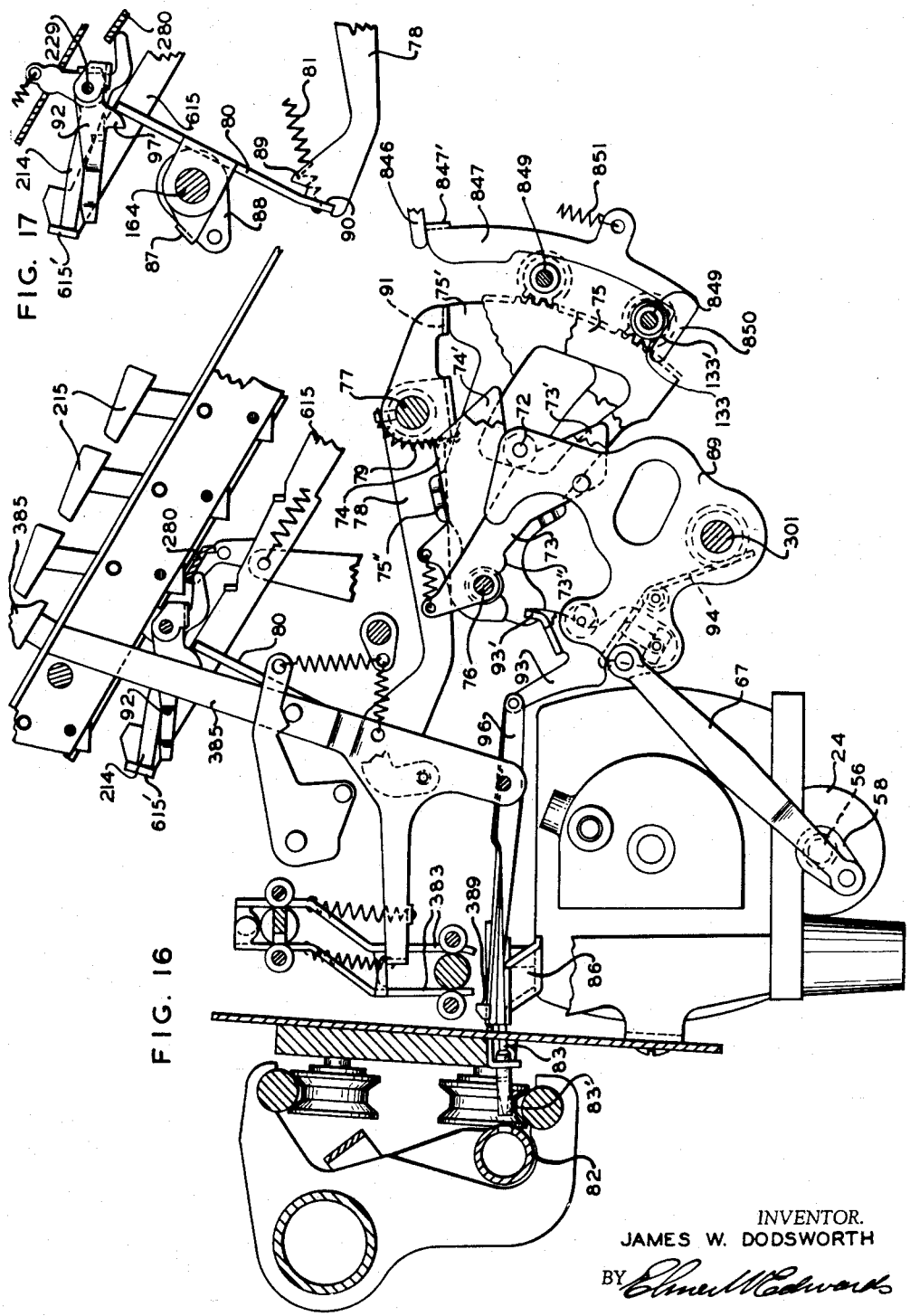

Feb. 13, 1962  J. W. DODSWORTH  3,021,054
PROGRAM CONTROL FOR ACCOUNTING MACHINE
Original Filed Sept. 11, 1958  21 Sheets-Sheet 14
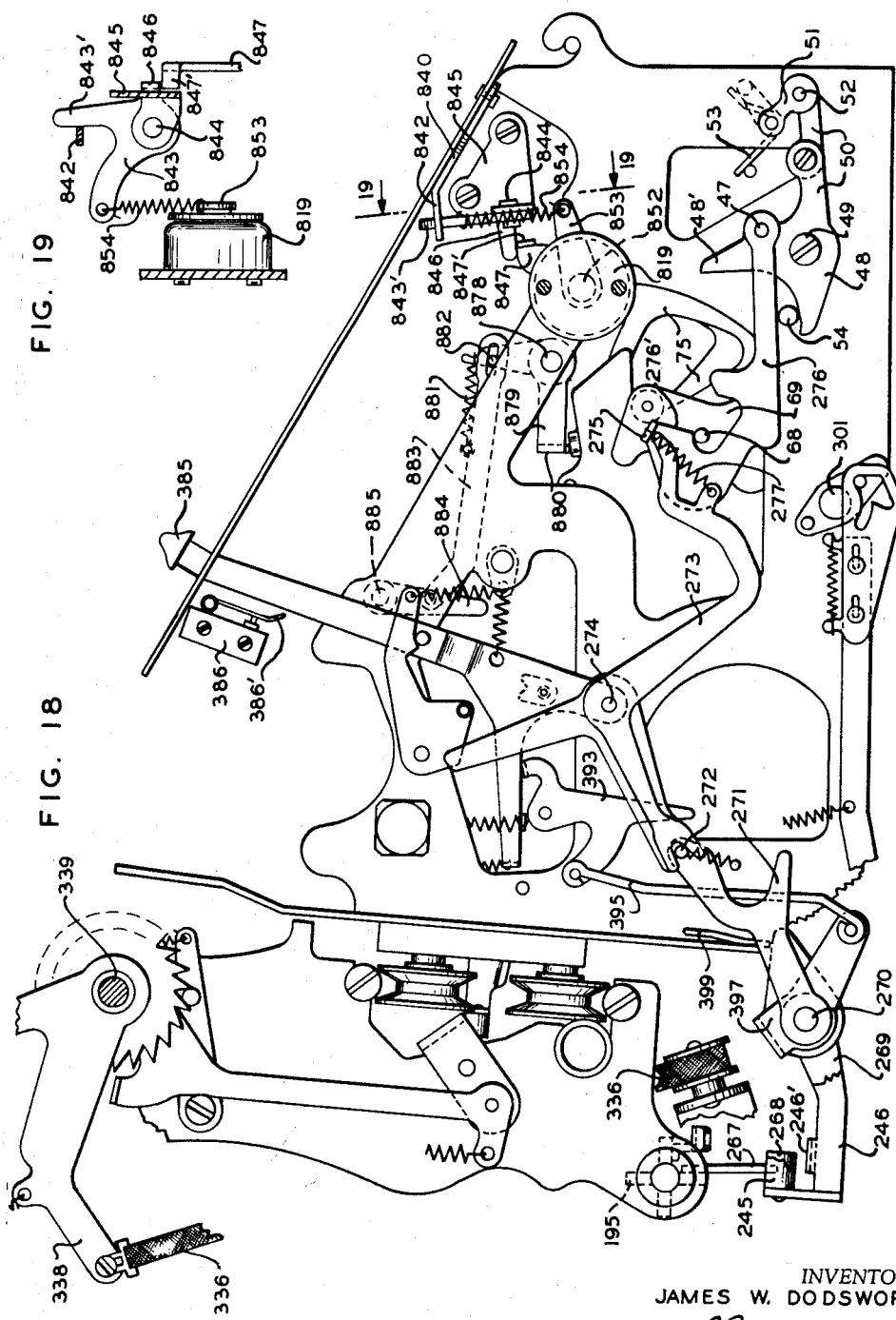
INVENTOR.
JAMES W. DODSWORTH
BY
AGENT Feb. 13, 1962   J. W. DODSWORTH   3,021,054
PROGRAM CONTROL FOR ACCOUNTING MACHINE
Original Filed Sept. 11, 1958   21 Sheets-Sheet 15
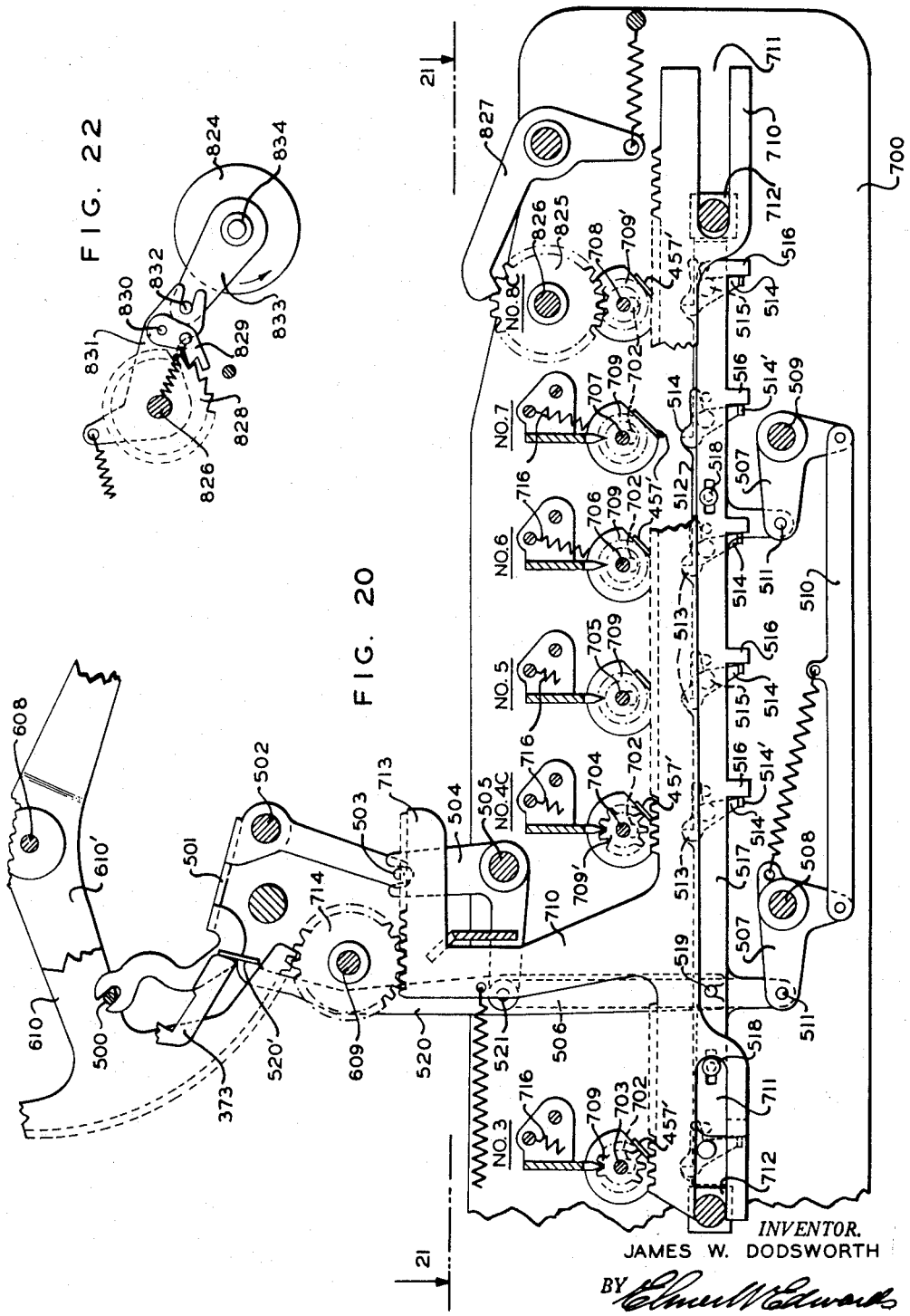
INVENTOR.
JAMES W. DODSWORTH
BY
AGENT Feb. 13, 1962  J. W. DODSWORTH  3,021,054
PROGRAM CONTROL FOR ACCOUNTING MACHINE
Original Filed Sept. 11, 1958  21 Sheets-Sheet 17
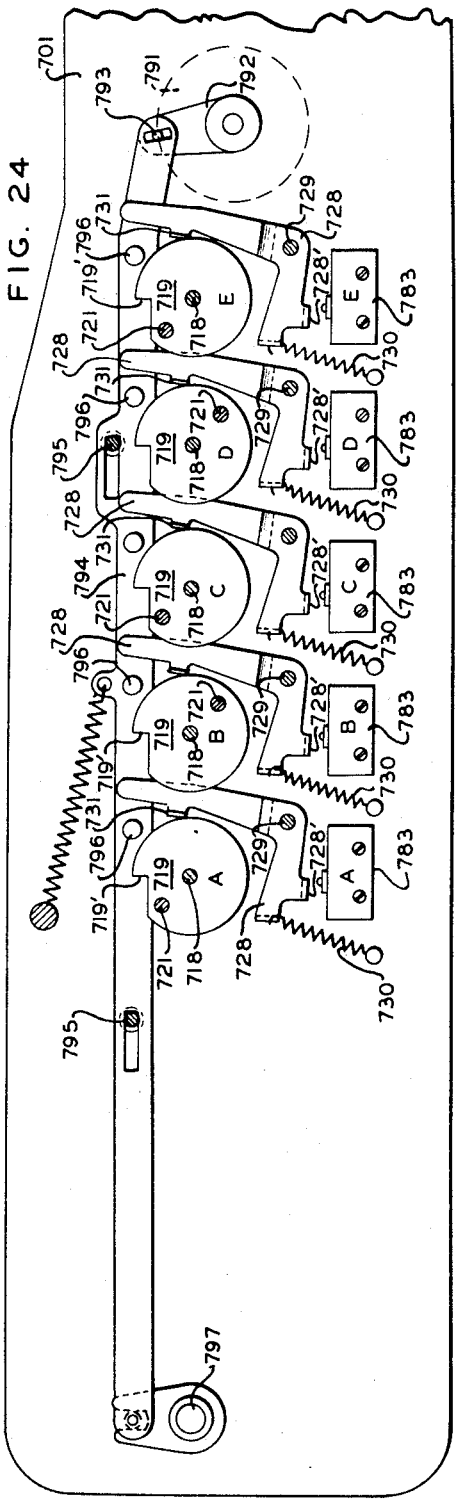
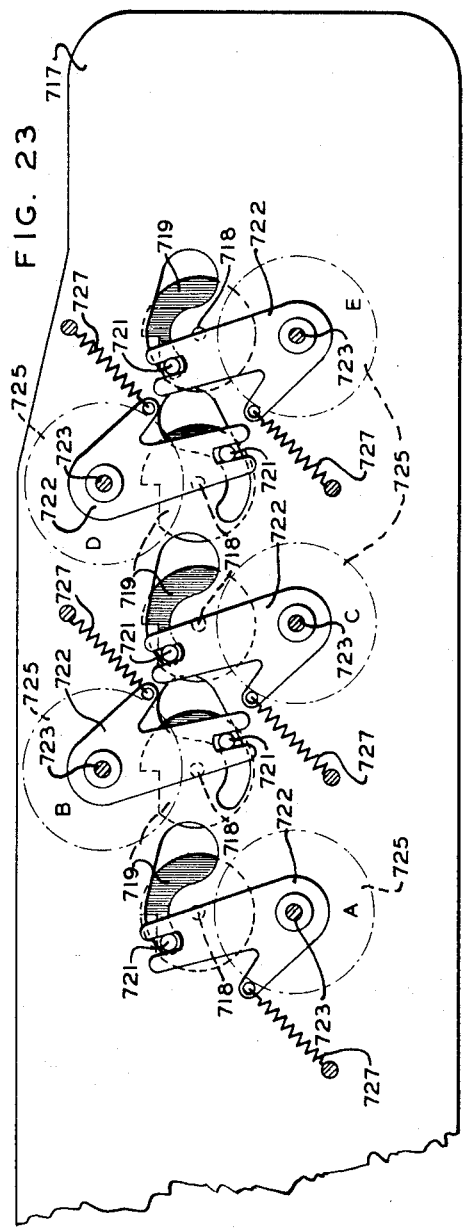
INVENTOR.
JAMES W. DODSWORTH
BY *Elmer W Edwards*
AGENT

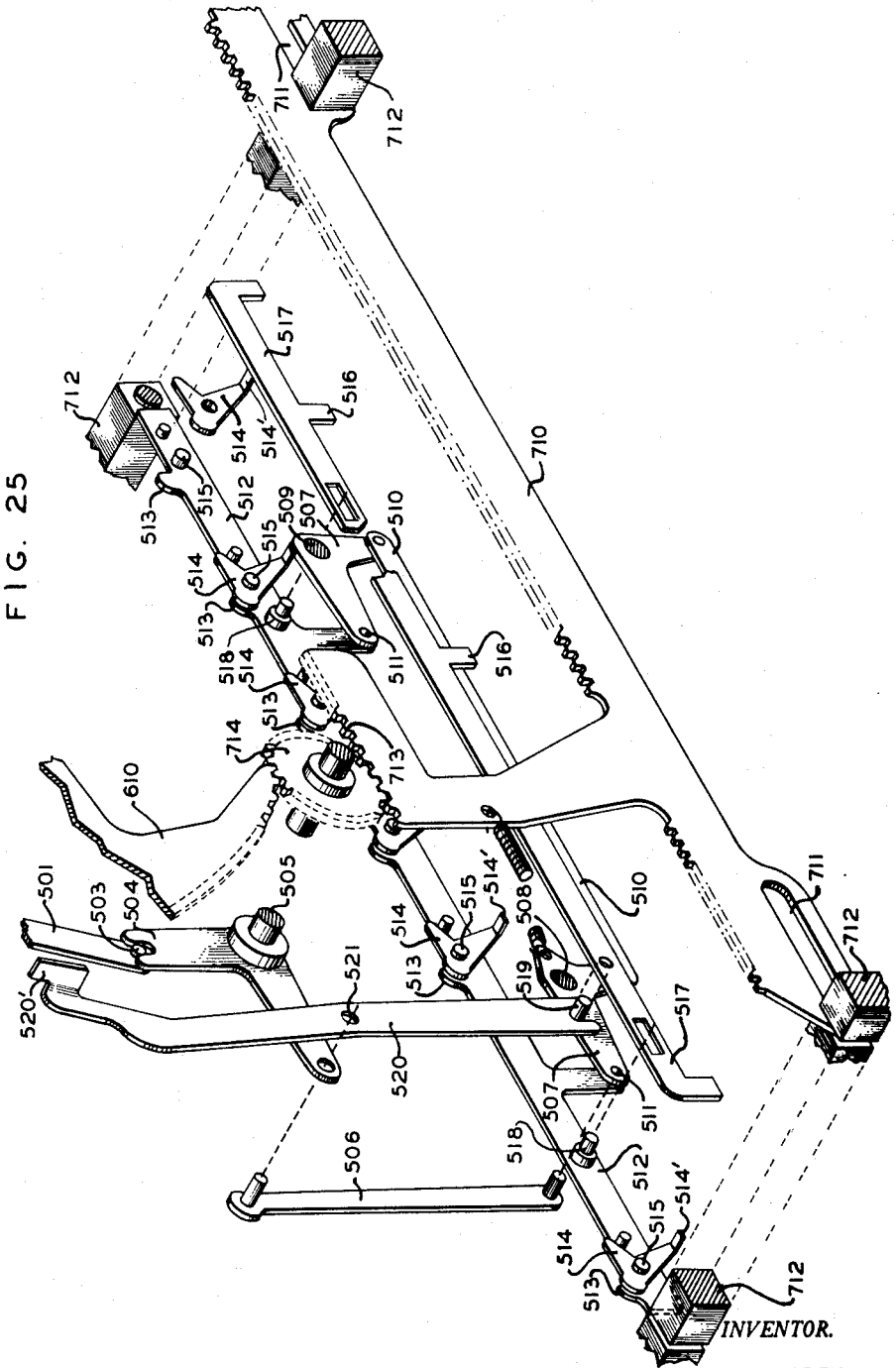

Feb. 13, 1962 J. W. DODSWORTH 3,021,054
PROGRAM CONTROL FOR ACCOUNTING MACHINE
Original Filed Sept. 11, 1958 21 Sheets-Sheet 19
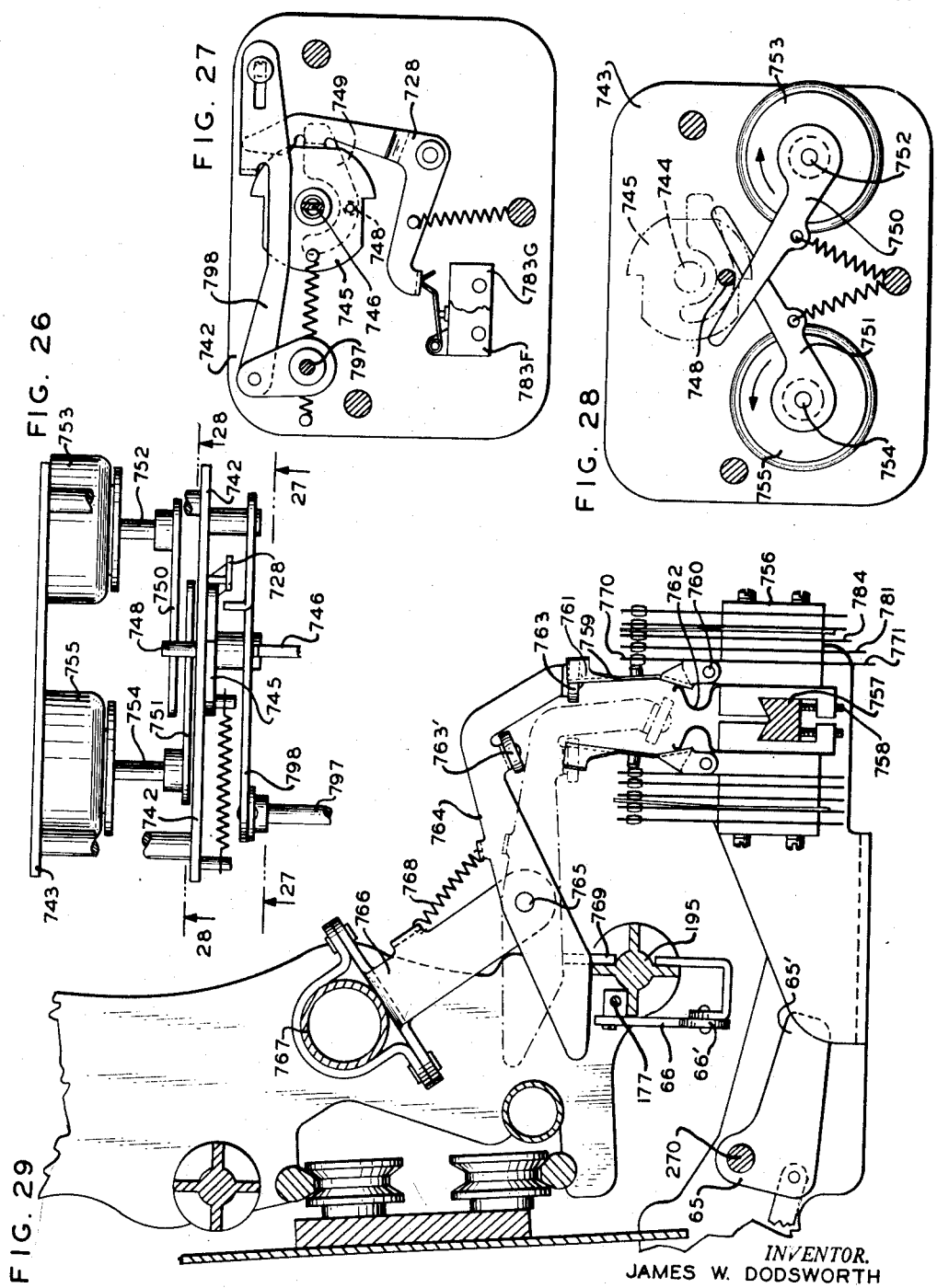
INVENTOR.
JAMES W. DODSWORTH
BY Elmer W. Edwards
AGENT

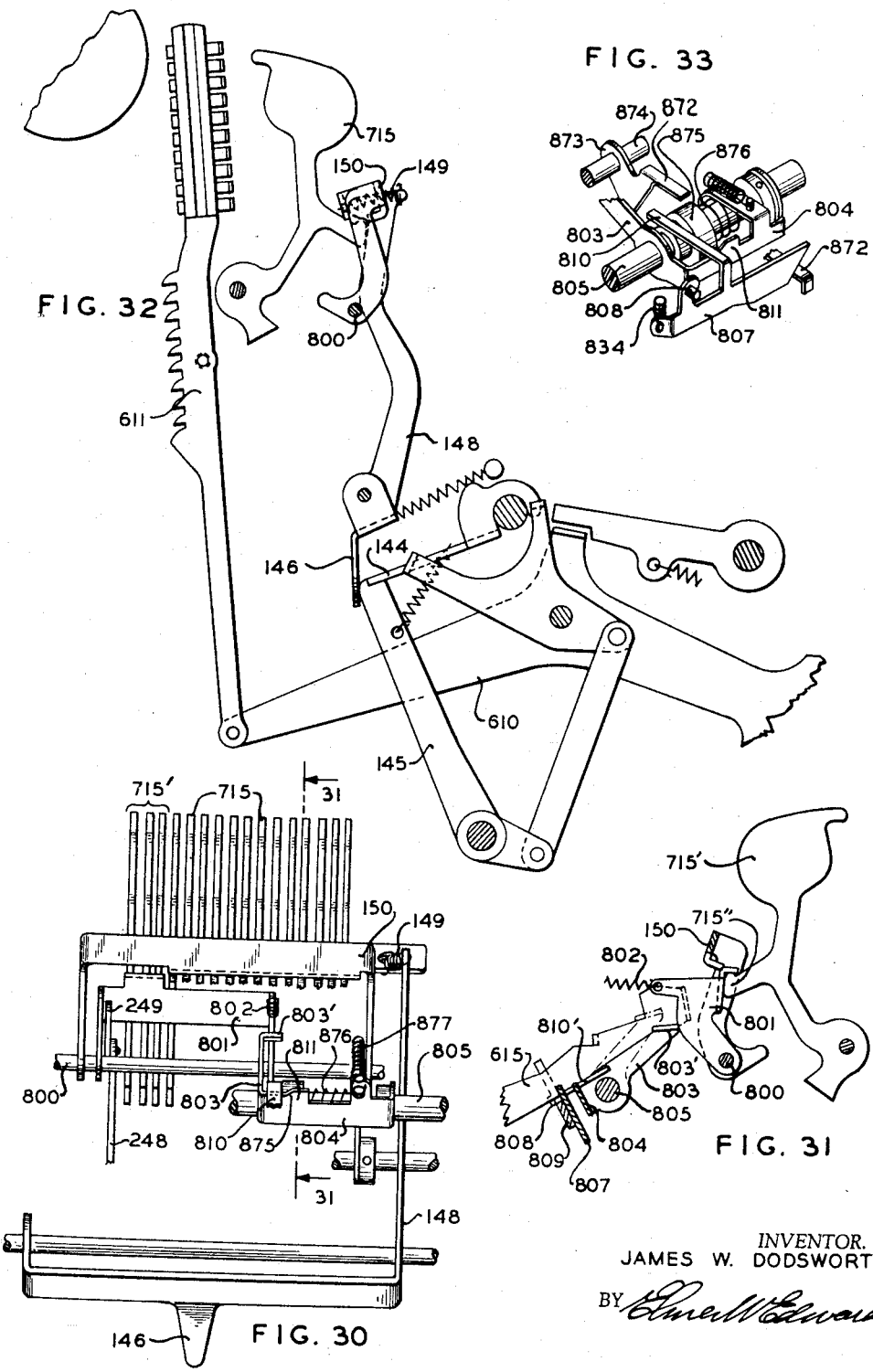

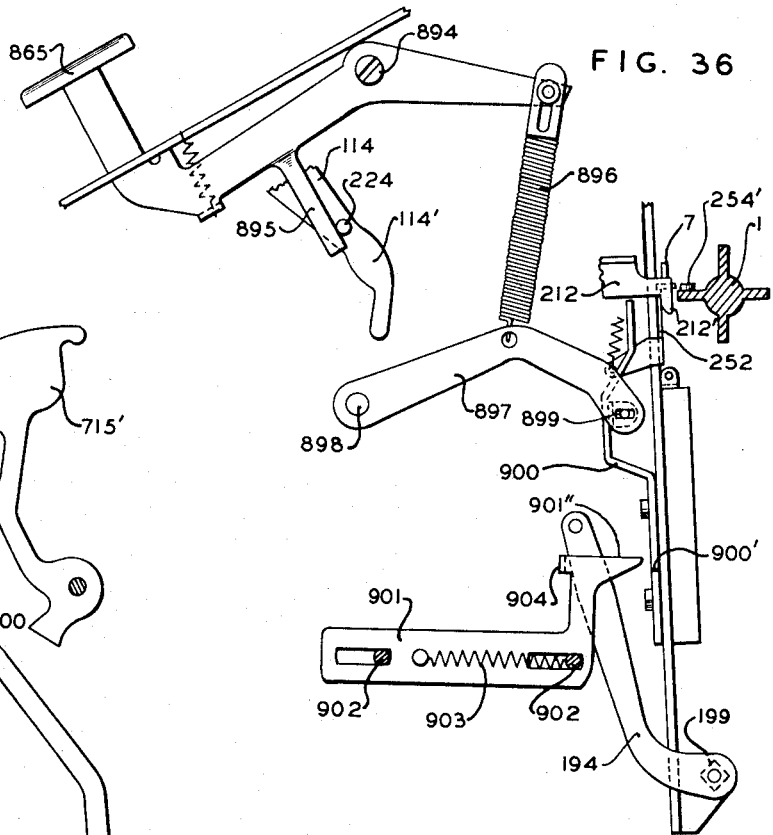
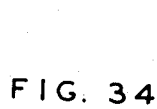
FIG. 34, FIG. 35, FIG. 36
INVENTOR.
JAMES W. DODSWORTH
AGENT

# United States Patent Office 3,021,054
Patented Feb. 13, 1962

3,021,054
PROGRAM CONTROL FOR ACCOUNTING
MACHINE
James W. Dodsworth, Mount Tabor, N.J., assignor to
Monroe Calculating Machine Company, Orange, N.J.,
a corporation of Delaware
Original application Sept. 11, 1958, Ser. No. 760,501.
Divided and this application Dec. 18, 1959, Ser. No. 860,554
14 Claims. (Cl. 235—60.2)

This application is a division of the application in the name of James W. Dodsworth, Serial No. 760,501, filed September 11, 1958.

This invention relates to a power-operated calculating machine of the type adapted for bookkeeping operations wherein debit and credit transactions are printed on one or more record sheets inserted in an automatic return cross tabulating and vertical feed paper carriage. Said carriage is equipped with the usual front feed construction which may be opened to receive both a journal sheet and a customer's ledger record sheet to cooperate with the journal sheet and be printed simultaneously therewith by manifold transfer means. More particularly the invention has relation to certain features that adapt such machines to the posting of patrons' accounts in banking houses, although the invention is not limited to machines of this particular type of work.

Still more particularly the invention relates to novel means whereby additional amount registers together with a plurality of counter registers associated therewith are added to the machine and to the means and manner for controlling the registers in accomplishing certain entries to be effected thereon in a posting series of operations.

In conventional practice the operator inserts within the platen carriage a journal sheet and thereafter for each of the active accounts will in turn insert forward thereof upon the carriage the ledger sheet related to the particular account. For each active account a series of crossfooter posting operations is performed upon the machine for the purpose of registering and printing within the proper columns of the related record sheets the respective current entries. During such posting operations it is desirable to have also certain special entries effected and printed automatically at an appropriate position of the record carriage. One such entry in addition to the usual plus deposit count entry is that for a plus count of the number of check entries made to each account and also subsequently the aggregate total of the number of checks posted for all the active accounts. Check entries however normally involve a subtractive operation upon the register devices and special arrangement must therefore be made in the register control devices whereby a unit count operation of opposite sign character to the subtractive operations of a check entry register is caused to be effected coincident therewith upon the check count register.

Another of such special entries is that for a count of the number of accounts processed through the machine during a day's work. The present invention contemplates that such an activity count is to be made in conjunction with a totalizing operation effected with the platen carriage in a given columnar position. Since total taking operations customarily involve a subtractive control for the machine cycle of operation special means are herein provided whereby for such operations the activity count will be effected in an additive manner.

Heretofore it has been customary to equip such machines with a separate item counter unit which is operated upon each depression of the total taking key and will provide on the machine only a visual indication of the total number of active accounts handled thereby for the day.

So that a supervisor may be kept fully aware of the activity of each machine however, and so program work loads more efficiently, it has been found advantageous in the present instance to have the total number of active accounts processed through a machine printed automatically upon the journal sheet following the final posting operation for the day.

One object of the present invention, therefore, is to provide program control devices adapted to the purpose of effecting an accurate printed picture of the daily activity of a machine and without requiring any added work upon the part of the operator.

As a further object the invention provides means whereby an activity count is additively effected automatically within a counter register when a totalizing operation is caused to be effected upon an amount register with the record carriage in a specific columnar position.

Another object of the invention is the provision of novel control means for obtaining an additive check count within a counter register during operations incident to the subtractive entries of checks within an amount register.

Still another object of the invention includes a novel arrangement for cooperating amount registers with certain associated counter registers, whereby printed totals of entries within the registers and associated counters are effected.

Novel means for including additional registers and for effecting a selective control of a multiplicity of the registers in accordance with a columnar position of a record carriage in effecting a program of operation are also provided.

Special means for determining selective operation of the record carriage in effecting a program of operation are also provided.

With these and incidental objects in view, the invention consists in certain novel features of construction and combinations of parts, the essential elements of which are set forth in appended claims, and a preferred embodiment of which is hereinafter described with reference to drawings which accompany and form part of the specification.

In the drawings:

FIGS. 1–1A combined, illustrate diagrammatically a plan view of a machine to which the invention has been applied and a wiring diagram of the circuit means related to the present invention.

FIG. 2 is an illustration of one example of work performed by the machine in effecting a crossfooter posting series of operations, including a schematic illustrating a sequence of operations of the record carriage in performing the work.

FIG. 3 is a right side cross-section viewed substantially through the center of the machine to which the invention is applied, showing the keyboard, register actuating, printing and totalizing devices.

FIG. 4 is a right side elevation of said machine, showing the cyclic operating devices and the control means therefor; and also a special skip/balance control key, the parts being shown in their normal position of rest.

FIG. 5 is a detail view showing the parts as positioned with the skip/balance key moved forwardly to balance column control position.

FIG. 6 is a similar view but with the parts shown as positioned when said key is moved to a rearward or skip column control position.

FIG. 7 is a detail view of means for disabling the carriage return means upon an operation of the skip/balance key, or upon an operation of the vertical total key.

FIG. 8 is a right side elevation showing portions of the register control means and of the automatic carriage return means.

FIGS. 9–11 are detail right side elevations showing portions of the total taking means.

FIG. 12 is a rear elevation showing the carriage tabulating means.

FIG. 16 is a left side elevation of said program means and showing a check count control means.

FIG. 17 is a detail view of the check count control means.

FIG. 18 is a left side elevation of certain parts under control of the vertical total key.

FIG. 19 is a detail view of a magnetically operated means for unlocking the total taking means.

FIG. 20 is a right side cross-section of the lower register unit, viewed substantially through the center of the machine and having parts connecting with certain of the parts shown in FIG. 3.

FIG. 22 is a detail view of the indexing means for the "Activity" counter register No. 8C.

FIG. 23 is a cross-sectional elevation taken on line 23—23 of FIG. 21 and showing the electromagnetic means for operating the register control discs whereby to set a register to active condition.

FIG. 24 is a cross-sectional elevation taken on line 24—24 of FIG. 21 and showing latches for locking the related discs and registers in their active set position.

FIG. 25 is a right side perspective of certain of the totalizing devices shown in FIG. 20.

FIG. 26 is a detail plan view of an electromagnetic add and subtract control device for the No. 3—3C register shown in FIG. 21.

FIG. 27 is a cross-sectional elevation taken on line 27—27 of FIG. 26.

FIG. 28 is a cross-sectional elevation taken on line 28—28 of FIG. 26.

FIG. 29 is a fragmentary left side cross-section of the record carriage and showing the program switches related to the electromagnetic control devices for the lower unit register selection.

FIGS. 30–35 are detail views of a printing hammer block means for controlling split printing between the amount and the counter registers.

FIG. 36 is a detail right side elevation of a selective control key (Balance Return) for returning the record carriage from the "Item" to the "Balance" columnar position of the journal sheet.

GENERAL DESCRIPTION

Figure 1:
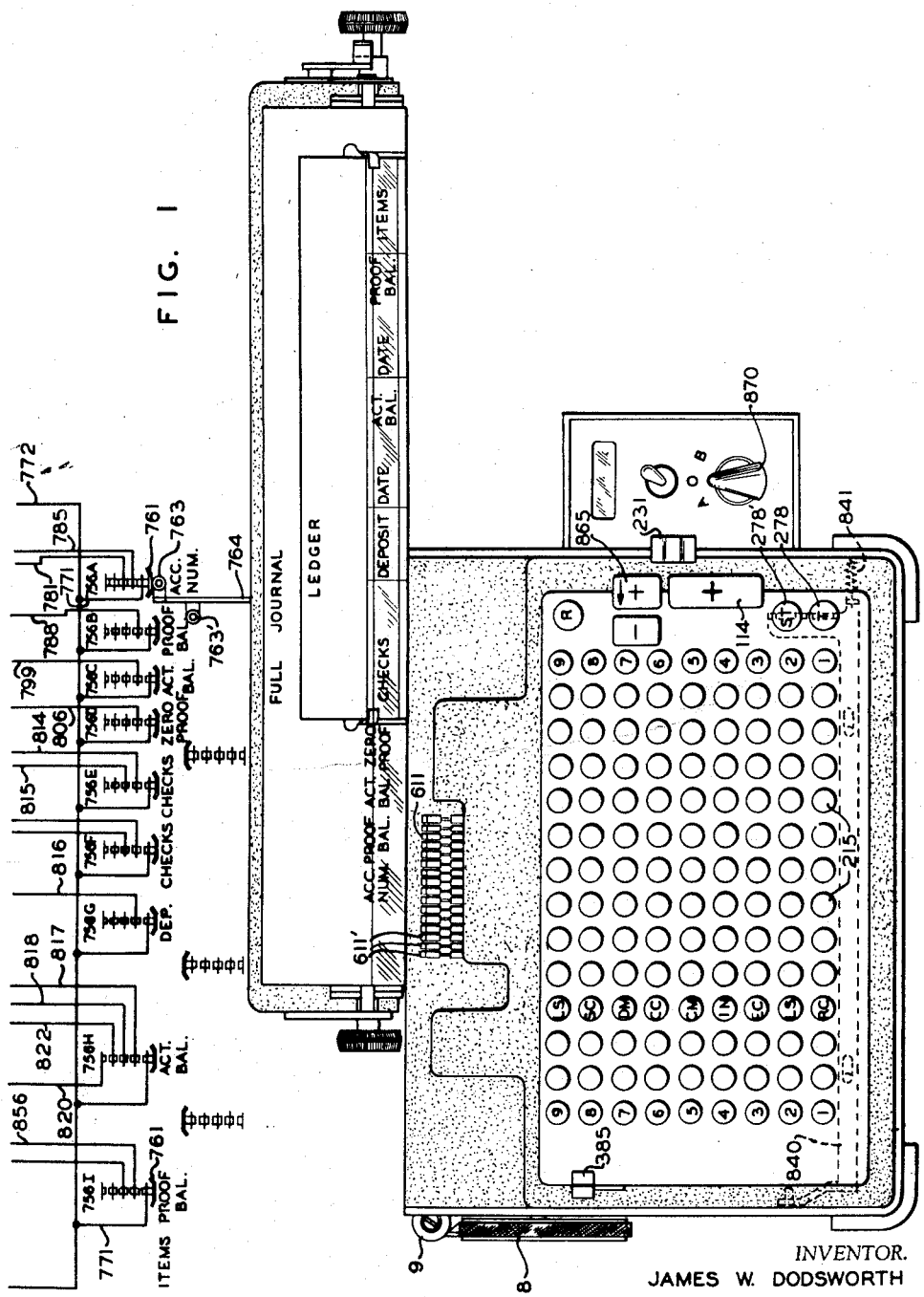

The machine to which the present invention has been applied is of well-known structure and in general is similar to that illustrated in U.S. Patents 2,756,926, dated July 31, 1956, and 2,780,407, dated February 5, 1957, both being issued to the present inventor. For other details of specific structures and operation not herein set forth reference is made also to the disclosures of the following U.S. patents, 1,915,296, issued June 27, 1933, 1,946,572, issued February 13, 1934, 2,134,280, issued October 25, 1938, and 2,261,341, issued November 4, 1941, all to Loring P. Crosman.

The basic construction of the machine to which the invention is applied is an add-subtract adding machine having two crossfooter totalizers of ten accumulator wheels each, automatic credit balance mechanism, automatic true positive or negative total taking mechanism, and printing mechanism for printing entries and totals.

The machine is equipped with both automatic cross-tabulating and power return mechanisms for the platen carriage, and with mechanical means automatically controlled from the moving carriage to variously effect register selection, cause an amount set up on the keyboard to be entered therein positively or negatively, and to take automatic subtotals and totals all at selected positions of the movable carriage. Skip column tabulating control means similar to that fully set forth in U.S. Patent 2,780,-407 of record is also provided.

For each denominational order the machine is provided with a three armed differential actuator lever numbered 610 (FIG. 3) loosely mounted on a shaft 608. The forward arm of each lever 610 terminates in a segmental registering rack; the rearward arm has a lister type bar 611 pivoted thereto, and the upper arm has pivotal connection with a differential stop bar 615 cooperating with a bank of digit keys 215 to limit the movement of the lever 610.

The digit keys are depressible to represent a value and when depressed are latched in position with the bottoms of their stems lying in the path of movement of the related stop lugs of the bars 615, and allow such bars to advance a distance proportionate to the value of the depressed key, upon operation of the machine. Depression of a digit key will also remove a column latch 214 from the path of movement of its related bar 615, which latches prevent movement of a stop bar 615 and lever 610 in any column in which no key is depressed.

A rock shaft 301 is provided with cam means 318 for governing the movement of a spring tensioned rocker frame 616, carrying a series of dogs 617, normally engaged by stud 659 of the lever 610. As shaft 301 is rotated forwardly (counterclockwise in FIG. 3) frame 616 will be rocked about shaft 608, and any of the levers 610 which have been released by depression of digit keys 215 will be allowed to rotate, under the influence of their springs 683, until they are stopped by the lugs of bar 615, contacting with the stems of the keys. Upon rearward (return) rotation of shaft 301, the dogs 617 will return the operated levers 610 to normal position. This excursion of levers 610 serves to register amounts set in the keyboard upon one or more accumulators and to set up a similar amount on the printing line of the type bars.

Shaft 301 is oscillated by an electric motor 100, connected through suitable gearing and clutch means 103—104, with a crank arm 105 (FIG. 4) connected by a rod 108 to an arm 316, fast upon shaft 301, so that as crank arm 105 is rotated, shaft 301 will be oscillated.

Motor operation is normally controlled by motor bars or keys through a clutch lever 106 which is provided with a roller adapted to close contact switch 110 in the motor circuit after lever 106 is moved out of restraining engagement with the spring operated clutch. A spring 111 tends to pull lever 106 away from the clutch, the lever being normally held in clutch engaging position by means of a latch 112. Latch 112 is controlled by a trigger 113, lying in the path of movement of a lever arm 114' connected with a motor key 114. Upon depression of key 114 trigger 113 is rocked clockwise to release latch 112 and clutch lever 106 will be pulled out of engagement with the clutch to start the machine in operation.

Upon release of key 114, latch 112 will return under spring action into latching position and, toward the end of the cycle of operation, an arm 115 connected with the crank member 105 will contact a tooth 116 of the clutch lever 106 and will force said lever back into latching position, breaking the electric circuit and bringing the end of lever 106 into the path of movement of the rotating clutch pawl 103 to terminate the cycle.

Add-subtract control for No. 1 and No. 2 registers

Means are provided as fully disclosed in U.S. Patent 1,946,572 of reference for selectively throwing the pinions 472 (FIG. 3) of the accumulators No. 1 and No. 2 into mesh with segments 610 either during the forward stroke of said segments, to effect subtractive registration on the accumulators or during return stroke of the segments to effect additive registration thereon. This means comprises a series of cams 121—122 (FIG. 8) on the register shafts 403 and a series of cooperating cams 124—124′ connected with rocker plates 419—419′, fast upon transverse shaft 421, and so arranged that when the high points of the cams upon the shaft 403 register with the high points of the cams connected with the plates 419—419′, the register pinions will be moved into mesh with the segments 610, against the tension of suitable springs. The register shafts being guided in their movements into and out of mesh with the segments by engagement with the walls of suitable slotted recesses in a fixed frame plate. The accumulators No. 1 and No. 2 are each capable of an additive or a subtractive registration or may be disabled by adjustment to non-add condition, by the appropriate location of the cams carried by the shafts 403, whereby said registers are adapted to the purpose of accumulating values entered into other accumulators during a crossfooter posting series or line of entries, such as will hereinafter be described.

In order that the No. 1 and No. 2 accumulators may be set for addition or subtraction, the two cams 121 and 122 project from the shaft 403 in different angular directions, so that a counterclockwise rotation of either shaft 403 (FIG. 8) will move the related cam 122 into registering position with the cam 124′, while cam 121 remains out of registering position with cam 124 and a further counterclockwise rotation of the shaft acts to move both the cams on the shaft so that cam 122 is now moved out of registering position and cam 121 is moved into registering position with their cooperating cams.

Plates 419—419′ are interconnected by pin and slot means 420 for movement in opposite directions and are rocked to change the positions of the cams 124—124′ relative to their cooperating cams 121—122 at the end of the forward stroke of the segments 610 and may also be rocked at the beginning of the registering operation, plate 419 having link connection 321 with a rocker 325 for this purpose. Rocker 325 is controlled by two cam arms 316 and 320 secured upon rock shaft 301, the arm 316 being adapted to engage a cam follower 327 pivoted upon the rear end of rocker 325 and arm 320 adapted to engage a similar cam follower 328 pivoted upon the forward end of the rocker. Said rocker devices are fully disclosed in the patents of reference and it is sufficient to say that in a normal condition of operation thereof a plate 326 is so positioned as to prevent counterclockwise pivotal movement of the rear cam follower 327 and to prevent clockwise pivotal movement of the forward cam follower 328, this plate being adapted to rock with rocker 325. As viewed in FIG. 8, at the beginning of a registering operation cam arm 320, contacting the forward cam follower 328 effects clockwise operation of the rocker 325 thereby rocking the plates 419—419′ to bring cams 124 into registering position with the related cams 122 while displacing cams 124′ from registering position with cams 121. As shown however cams 121—122 for both registers are set for a non-add operation and will remain out of engagement with the actuator racks 610. Suitable means programmed for operation under control of the record carriage are provided for effecting a rotation of shafts 403 in a given direction to selectively determine a register selection and the character of operation to be performed thereon, as will hereinafter be described.

Total taking

The registers are of the well-known crawl carry type wherein a total standing in any one of the registers may be cleared therefrom and printed upon the record sheet by engaging the pinions 472 of the register with the segments 610 and thereafter successively releasing the differential stop bars 615 to allow the segments 610 to rotate the accumulator wheels subtractively until suitable zero stops 457 (FIG. 3) thereon engage cooperating stop hooks 367 which have been brought into their path of movement in the following manner, and being more fully described in reference Patent 2,261,341.

The total key 278 (FIG. 9) upon depression will act to release the column latches 214 (FIG. 3) by engagement of a rearward arm of said lever with a stud 279 fixed in the arm of a releasing bail 280 extending transversely of the latches and serving to move them out of engagement with the stop bars 615, thereby freeing the actuator segments from the control of said column latches.

To initiate a successive zeroizing of the numeral wheels the total key when depressed engages a cranked extension 348′ of a shaft 348. Fast on said shaft is an arm 349 engaging a stud 350 fixed in a lever 351 fulcrumed at 352 upon a supporting arm 353 which in turn is pivotally mounted on a shaft 354. A rod or bail 355 is supported upon end plates 356 fast on the shaft 354, the right-hand end plate 356 being normally supported by a toggle connection 357, one member of which is pivoted on the frame of the machine at 358. Bail 355 extends beneath a series of latches 361 (FIGS. 3, 11), directly controlling the successive action above referred to.

Rocking movement of shaft 348, caused by depression of total key 278, will through arm 349 rock lever 351 and arm 353 in clockwise direction, as viewed in FIG. 9, clockwise movement of arm 353 effects also a clockwise movement to the lower arm of toggle 357, through means of link connection 353′, thereby breaking the toggle and permitting bail 355 to be moved downwardly under the influence of a spring 360.

The right-hand latch 361′ (FIG. 10) of the series of latches supported by bail 355 has link connection 362 with a member 363, freely rotatable upon shaft 354 and provided with an extension or tripping finger 364, adapted under the influence of spring 365, to disengage the segment latch 617 (FIG. 3) of the extreme right-hand or units order actuator lever 610. The pivot connection between members 361′ and 362 lies below a plane intersecting the distal axes thereof, so that downward buckling of these parts is prevented only by bail 355. Therefore, upon release of latch 361′ from the restraint of bail 355, tripping finger 364 will act to release said right-hand actuator lever, which will thereupon be rotated by its spring 365 to rotate the related numeral wheel.

The above described movement of member 363 will also, through link connection 366, move related hooks 367 (FIG. 3) into the path of movement of the stop member 457 of the related numeral wheels, said stop member 457 engaging the related hook 367 as the wheel comes into zero or clear registering position and causing the related type bar 611 to be positioned wherein the type at the printing line will represent the amount which has been subtracted from the related numeral wheel. Each adjacent latch 361 and related link 362 forms a toggle member normally holding the related higher order members 363 in latched condition, whereby the described lowering of bail 355 does not immediately release the latches 362 related to the members 363 in the denominational orders to the left of the units order. As each next right-hand or lower order numeral wheel arrives at its zero registering position the toggle 361—362 immediately to the left is caused to be broken, so that the members 363 are operated successively under influence of their respective springs 365. This is effected by contact of the stop member 457 of the lower order wheel each time with a roller 371 mounted on a dog 372, pivoted upon the zero stop 367 and engaging a shoulder of a push rod 373, pivotally connected to a tripping lever 374. Tripping lever 374 is provided with a lug 376 overlying the adjacent left-hand or higher order latch toggle link 361, and serves to break the toggle when roller 371 rides to the top of the shouldered zero stop member 457.

The member 363 at the extreme left-hand end of the series has universal type connection 377 (FIG. 11) with a lever 378 fast to the left end of a transverse shaft 379. Secured to the opposite end of shaft 379 is a lever 380 (FIG. 9) provided with a lug 381 overlying a shoulder of a connecting rod 130 having pivotal connection with the latch means 112 for the clutch release lever 106, earlier described. Heretofore, shaft 379 at the completion of a zeroizing operation would be rocked clockwise by a release of the higher order member 363, so that lug 381 may depress a rod 130 and thereby initiate an automatic operation of the cyclic devices operable by clutch means 103—104 and thus effect a printing of the amounts set up on the type bars 611, as in well-known manner.

In the instant case however such control of a totalizing cycle of operation is placed under the joint control of a selective one of the counter registers together with a selective one of the amount registers, as in the manner hereinafter to be described.

Carriage tabulating

Figure 12:
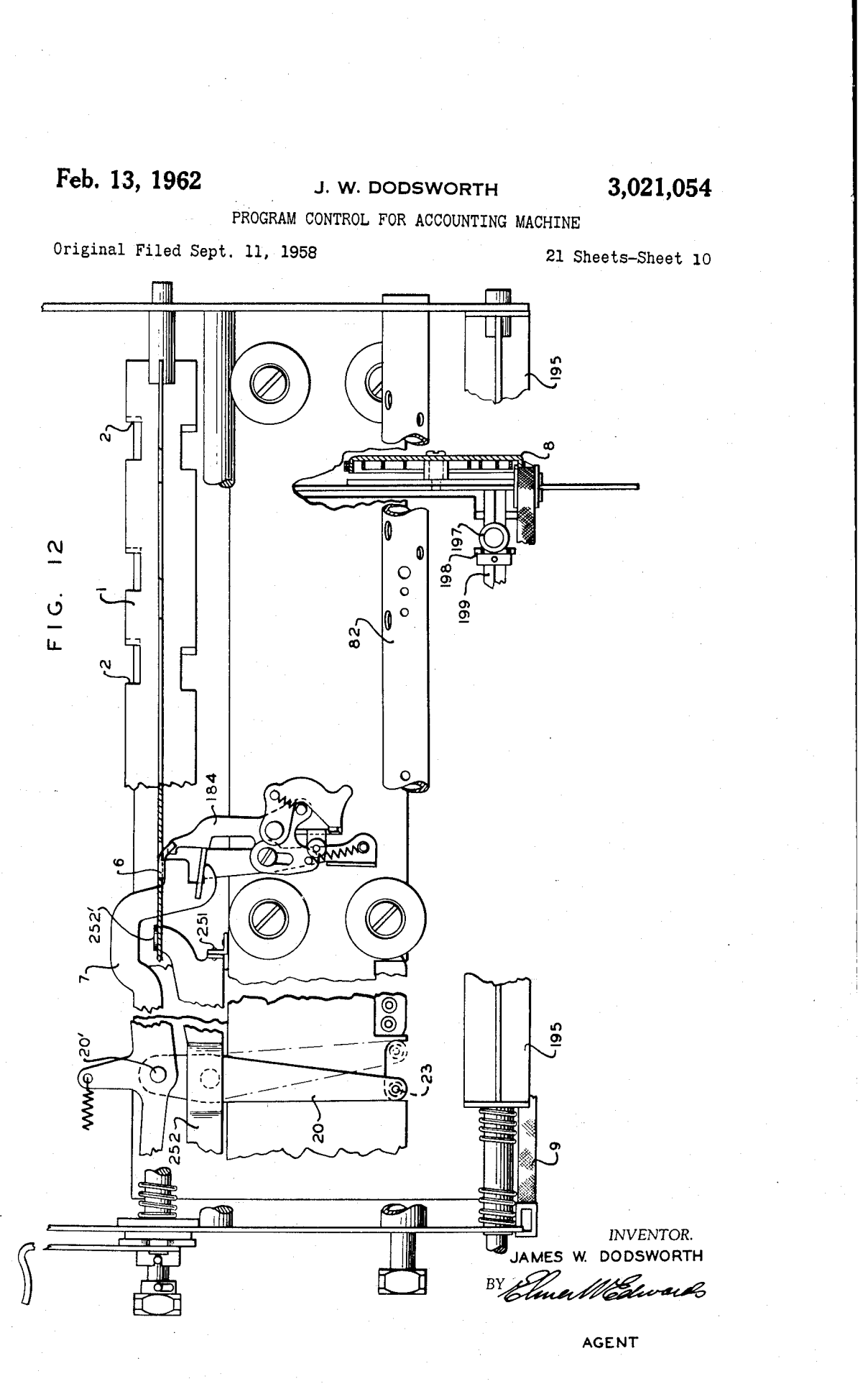

The platen carriage of the machine is tabulated from right to left under influence of a spring drum 8 (FIG. 12) connected to the carriage by a tape 9. Suitably supported in the end frames of the carriage is a tabulating program bar 1 provided with a series of notches 2 spaced in accordance with the columnar positions of a given form sheet, and adapted by engagement with a projection 6 of a detent lever 7 to secure the carriage against lateral movement of spring drum 8.

Under normal adjacent column tabulation the detent 7 is disengaged from bar 1 near the end of a machine cycle of operation by the downward movement of a member 184, operated in known manner, as set forth in U.S. Patent 1,946,572. Upon release of bar 1 by the end 6 of detent 7 the carriage will be pulled toward the left (FIG. 1) by the spring drum 8, and the detent, being immediately released by the member 184, will rise and ride on the under edge of bar 1. The carriage thereafter moves sufficiently to bring an adjacent one of the stop notches 2 of bar 1 into register with the end 6 of the detent 7, said end contacting a wall of the adjacent notch to arrest the platen carriage.

Control means for skip column tabulating

Skip column tabulations in which the means for releasing detent 7 for reengagement with bar 1 must be delayed until any of the notches 2 of bar 1 that are not to be effective are carried past the end 6 of detent 7 are also provided, which in general are similar to the devices set forth in reference Patent 2,780,407, but include also certain modifications of structure and operation, as will now be set forth with relation to FIGS. 4–7.

Pivotally mounted upon a stud 230 (FIG. 4), fast to the right side framing of the machine, is a three-position machine operating control lever 231, corresponding to the skip/balance control lever 201 of the above patent. Lever 231 has link connection 232 with a stud 233 fast in an upwardly extending arm of a bell crank lever 234, pivoted upon a stud 202 fast to the side frame. Stretched between the studs 202, 230 is a centralizing spring 235 embraced by suitable ears 236 of bell crank 234, whereby to bias the said bell crank and lever 231 each to their normal central position. Pin 233 of bell crank 234 has engagement with a notch cut in the upper edge of a coupling pawl 237 pivotally mounted at 238 upon a three-position control lever 201, in turn pivotally mounted upon the stud 202. Coupling pawl 237 is biased in an upward direction by suitable spring means 239, whereby to maintain said notch in engagement with the pin 233. Lever 201 also is biased toward its central control position through means of a spring 203 connected at one end to a centralizing lever 204, pivoted on stud 230. Lever 204 has an upper end thereof in engagement with a pin 205 in lever 201 and the lower end thereof in engagement with a lug 206 of said lever 201. The opposite end of spring 203 is connected to a bell crank lever 207 pivoted to the framing at 208 and serves to bias said bell crank lever in a counterclockwise direction.

Pivotally connected at 209 to the lever 207 is an upwardly extending finger 210 provided with a projection 211 normally positioned intermediate of the levers 212 and 213 fulcrumed at 229 to the framing of the machine. An arm 217, pivotally connected at 218 to the lever 201 extends rearwardly and is provided with a pin 219 projecting into a triangular cam notch 220 of finger 210. A spring 221 connected to finger 210 and arm 217 biases said arm upwardly, forming a yieldable connection between the lever 201 and finger 210. Lever 207 and finger 210 are held in lower position against tension of spring 203 by engagement of projection 222 of lever 207 with a lower arcuate edge 223 of the lever 201.

In a manually operated rearward movement of operating lever 231 the lever 201, by means of links 232 and pin 233, is rocked in a clockwise direction so that cam 217 will be moved rearwardly and pin 219 engaging the rear cam face of cam notch 220 will cause arm 217 to yield downwardly. Further movement of lever 201 releases arcuate edge 223 from projection 222 whereupon spring 203 will impart counterclockwise movement to lever 207, moving finger 210 upwardly and rearwardly through pin and slot engagement 219—220, the pin being urged upwardly by spring 221, to position projection 211 of said finger above the lever 212 for the purpose to be described.

A rearward arm 204' of centralizing lever 204 engages a pin 224 of the add key 114 and during rearward movement of lever 231, pin 205 of lever 201 will rock lever 204 in clockwise direction to depress the add key and start the cycle of operation in the manner previously described, during which cycle the value set up on the digit keys 215 will be stored into the accumulator wheels and printed upon the record tape in well-known manner.

Operating lever 201 is held in operated position by projection 222 of lever 207 until released near the end of a cycle of operation, in the following manner:

Mounted upon the cam arm 320 fast to rock shaft 301 is a pin 225, adapted upon return clockwise movement of arm 320 to engage the bottom edge of a one-way pawl 226, pivoted at 227 upon the lever 207, and to rock said lever in a clockwise direction. Clockwise movement of lever 207 will release lever 201 for restoration by centralizer 204, while spring 235 acts also therewith in restoring the operating lever 231, whereupon plus bar 114 is also permitted to return to its normal position and the machine cycle will be terminated, as in the manner heretofore described.

Special means, as will now be described, have been provided to prevent the occurrence of a second machine cycle of operation in the event that an operator continues to hold the lever 231 in rearward or skip column position.

Pivotally mounted at 209 upon the lever 207 is an upwardly extending finger 240 having a pin 241 extending within a suitable slotted opening 242 of the coupling lever 237, having engagement with the pin 233 of lever 201 as above described. Finger 240 is held, by means of a spring 243 connected to the upper end thereof, so that pin 241 is normally positioned to be out of cooperation with a forward shoulder 249 and a rearward shoulder 250 formed on the coupling 237 by the configuration of the said slotted opening 242. In the clockwise operation of lever 201 above described however coupling lever 237 is carried rearwardly thereby and finger 240 upon the described release and upward operation of lever 207 is caused to be carried upwardly therewith and pin 241 thereupon snaps into engagement with the forward shoulder 249 of the coupling 237, as shown in FIG. 6. Thus upon the restoral of lever 207 to its normal lower position link 240 moves downward therewith and pin 241, engaging shoulder 249, will rock coupling pawl 237 downwardly and out of engagement with pin 233, thereby permitting the restoral of lever 201 by means of centralizer lever 204 (FIG. 4). Upon a subsequent release of operating lever 231 centralizer spring 235 will act to restore said lever 231 and thereby re-engage pin 233 with coupling pawl 237.

During the above clockwise movement of lever 207 finger 210 is moved downwardly and projection 211, being positioned above lever 212, as previously described, rocks lever 212 counterclockwise which, through a rearward projecting end 212' thereof, imparts a counterclockwise rocking movement to the carriage tabulating detent lever 7 (FIG. 12) earlier described. The left end 6 of detent 7 is adapted for sliding engagement with the under surface of tabulating bar 1, and during the above operation end 6 is disengaged from the spaced stop surface of a notch 2 of said bar to release the platen carriage for tabulation. The above described restoration of lever 201 (FIG. 4) also, through pin and slot connection 219, 220 releases the projection 211 from lever 212.

Figure 13:
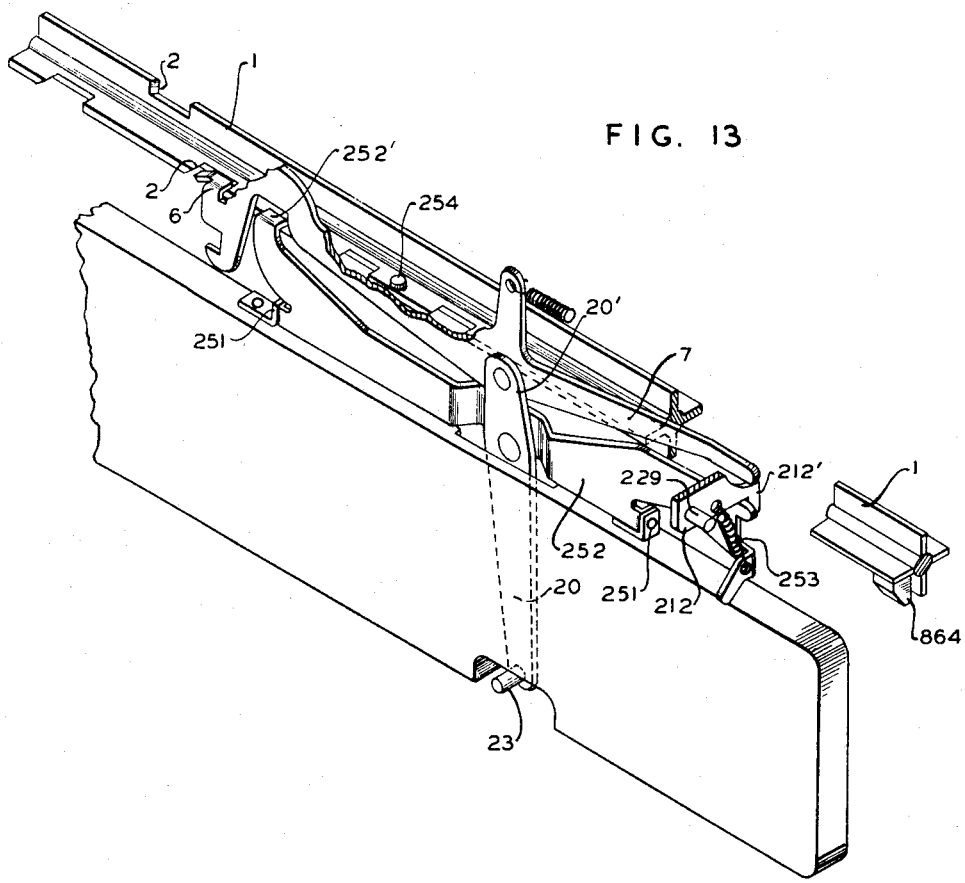
FIG. 13 is a front perspective view of a portion of the platen carriage locating means showing part of the notched tabulator bar and the means for controlling the reengagement of the locating means with said bar.

Fulcrumed at 251 (see also FIGS. 12, 13) upon the top edge of a rear cross plate of the machine is a latch plate 252 biased clockwise against projection 212' of lever 212 by a suitable spring 253. Thus upon the operation of latch 212, for releasing tabulating detent 7 free of tabulating bar 1, as above described, projection 212' is lifted away from latch plate 252 permitting said plate to rock beneath said projection and thereby latch detent 7 in operated position. Upon the release of detent 7 from a spaced stop 2 in a machine cycle of operation performed under control of a rearward movement of lever 201, therefore, the platen carriage will continue in a tabulating movement until brought to rest by the engagement of a suitably placed pin 254 on bar 1 with a cam projection 252' of the latch plate 252, said engagement serving to rock latch plate 252 from beneath projection 212' so as to release detent 7 in time to permit reengagement of the end 6 thereof with a stop edge 2 corresponding to the subsequent columnar position to which the carriage is to be brought to rest.

A forward movement of operating control lever 231, to the position illustrated in FIG. 5, will act to not only render ineffective the previously described stop devices for bringing the carriage to rest in successive columnar positions, but will also render ineffective the above described skip tabulating stop means controlled by the pin 254, so that the carriage will then continue in a tabulating movement until stopped in a still later columnar position by means of a subsequently spaced control pin 254, as in the following manner.

Forward movement of lever 231 (FIG. 5) through engagement of pin 233 with coupling pawl 237 will impart counterclockwise movement to lever 201. Upon said movement and the subsequent release thereby of lever 207 finger 210 is carried upwardly and, by means of pin and slot connection 219, 220, projection 211 of said finger will be positioned above the lever 213. Thereafter as finger 210 is subsequently restored at the end of the cycle of operation, as in the manner earlier described, projection 211 will rock lever 213 counterclockwise. A lug 212" of the lever 212 underlies the lever 213 and during said operation of lever 213, lever 212 will also be rocked to release the carriage locator detent 7 (FIG. 13) from bar 1, as earlier described.

A downwardly extending arm of lever 213 (FIG. 4) is provided with a pin 255 engaging the lower edge of a latch member 256 pivotally mounted at 257 to the stationary frame of the machine. During the above operation of lever 213, pin 255 is carried rearwardly and latch 256, under influence of a spring 258, is moved into position for holding the lever 213 and through lever 212 also the detent 7 (FIG. 13) in their operated positions.

The earlier described engagement, therefore, of a first control pin 254 with the cam projection 252' for rocking latch plate 252 will at this time be ineffective for releasing detent 7 and the carriage will continue further in a tabulating movement until stopped by a subsequent engagement of the cam projection 252' with a suitably placed second control pin 254, the stopping devices being rendered effective as hereinafter described.

For the above described operation relating to a forward movement of control lever 231 the pin 241 of finger 240 will, in lieu of engaging shoulder 249, be caused to engage shoulder 250 of coupling pawl 237 for disengaging said pawl from pin 233, whereby to uncouple lever 201 from the operating lever 231, as in the manner and purpose above set forth for a rearward operation of said lever 231.

Figure 2A:
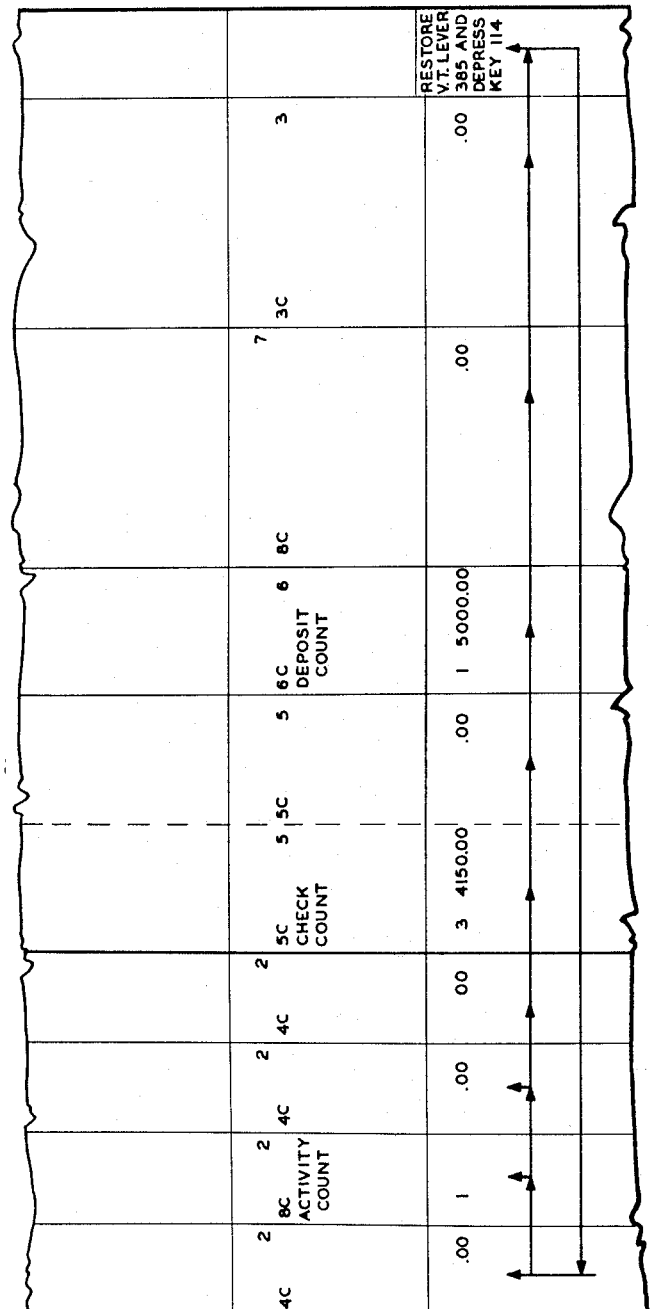
FIG. 2A illustrates the vertical total series of operations related to the above crossfooter posting operations.

Specific applications of the above operations of control key 231, together with other control means operable thereby, will be set forth hereinafter in connection with a description of the posting routine illustrated in FIG. 2.

*Carriage control of registers No. 1 and No. 2*

Figure 15:
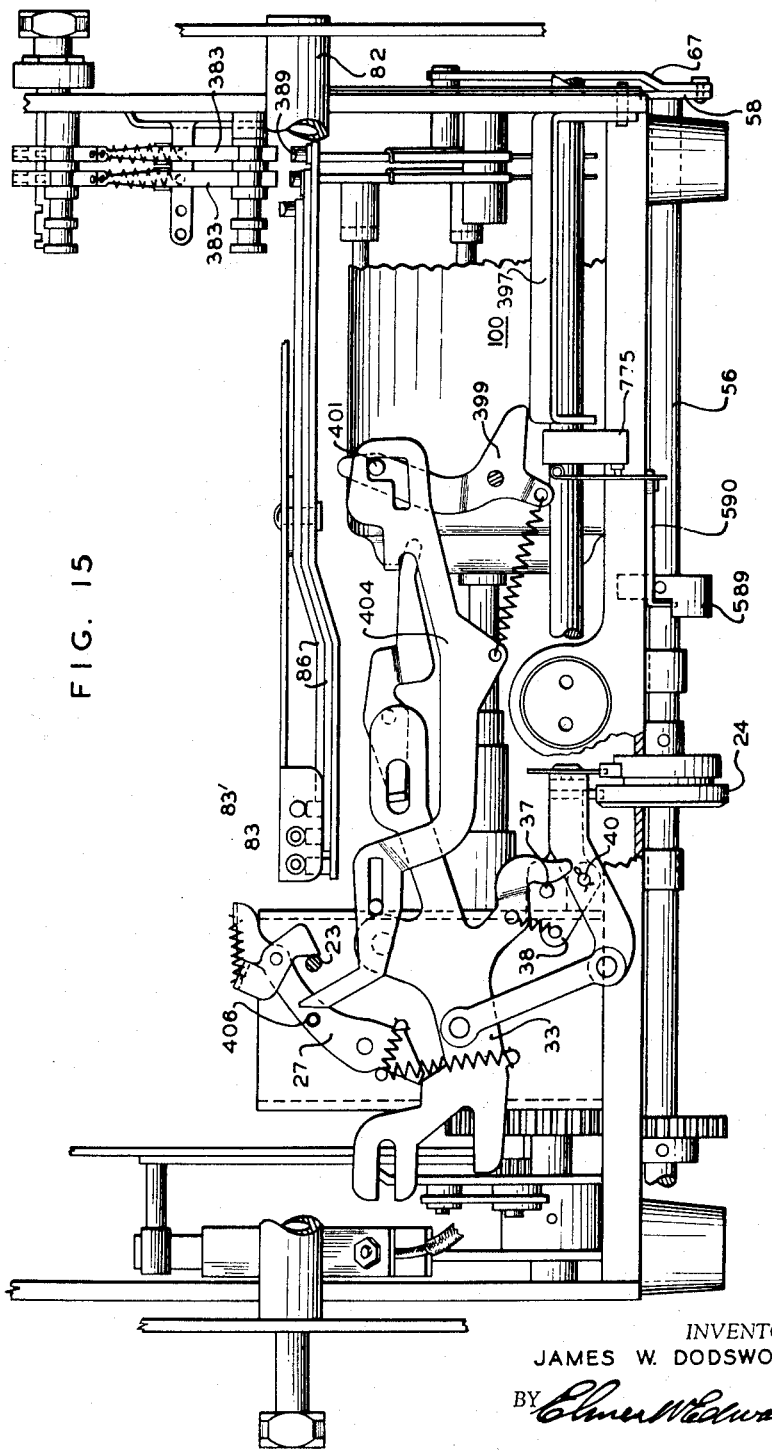
FIG. 15 is a rear elevation showing the register selection clutch for the mechanically operated program means.

Well-known mechanical register control means for effecting a register selection and the character of operations to be performed thereon in accordance with the tabulated position of the record carriage are provided for the No. 1 and No. 2 registers, said control means being operated automatically upon release of a spring charged clutch operating lever 33 (FIG. 15) by a reciprocatory operation of a pin 23, of lever 20 (FIG. 12), in the earlier described movement of the carriage tabulating detent 7, as in the manner fully disclosed in U.S. Patent 1,946,572.

Upon operation lever 33 will engage a pin 37 fixed to a clutch control lever 38, moving the latter about fulcrum 40 out of engagement with the usual pawl of the spring engaged one-cycle clutch means 24 of well-known design.

Clutch 24 is adapted to connect the motor 100 with a shaft 56, having fast thereon a crank arm 58 connected by link 67 (FIG. 16) with a rocker 69, loosely mounted on the shaft 301, to thereby impart a reciprocatory movement to said rocker. Rocker 69 has suitable spring connections 94 with a series of levers 93, connected each by a link 96 with one end of whiffletrees 86, the other ends of the whiffletrees being connected with suitable feelers 83 adapted for sensing an index tube 82 of the carriage to thereby control register selection and operation in the well-known manner set forth in said U.S. Patent 1,946,572.

*Automatic total means*

As set forth in U.S. Patent 2,780,407, a total may be taken automatically through means of suitably placed cam plates on the flanged program bar 195 (FIGS. 12, 14) supported within the end frames of the shiftable record carriage. As the carriage is shifted into certain columnar positions, to be hereinafter described, a cam plate 267 (FIG. 18) is brought to rest upon a roller 268 of a lever 269 fast to a transverse shaft 270. Shaft 270 is pivotally supported within the base structure of the machine and upon an engagement of cam plate 267 with roller 268 will be rocked in a counterclockwise direction, as viewed in FIG. 18.

Secured to the left end of shaft 270 is an arm 271 having pin and slot connection 272 with a lever 273 fulcrumed at 274 to the left-hand framing of the machine. The forward end of lever 273 has engagement with a projection 275 of a pawl 276, pivotally mounted at 47 upon a bell crank lever 48. Projection 275 serves to normally hold pawl 276 out of the path of movement of a pin 68 secured in the rock arm 69 of the power operated register program control means earlier described. Upon counterclockwise movement of shaft 270, however, arm 271 imparts clockwise movement to lever 273 and the forward end of said lever moving downwardly will permit pawl 276, under influence of spring 277, to fall and rest upon pin 68.

Bell crank 48 is pivotally mounted to the framing at 49 and the forward end of said bell crank forms a toggle link connection 50 with an arm 51 fast to a shaft 52, normally tensioned under influence of a suitable spring 53 for clockwise rotation, as viewed in FIG. 18. Spring 53 through toggle action of link 50 serves to hold lever 48 normally against the stud 54 fast in the machine framing.

During a reciprocatory movement of rock arm 69, upon operation of the register program devices previously described, the surface 276' of pawl 276 will now fall into the path of return movement of the pin 68. Lever 48 therefore during the last portion of the return movement of said pin will now be rocked counterclockwise beyond toggle center position, whereupon spring 53 will act to complete the movement and impart a clockwise rotation to the shaft 52, until stopped by contact of an arm 48' of lever 48 with stud 54.

Pivotally mounted at 57 (FIG. 8) upon a crank arm 55, secured to the right-hand end of shaft 52, is a finger 59, provided with a projection 59' normally overlying the forward end of the total key 278. In the above described operation of shaft 52 finger 59 is carried downwardly to depress the total key 278 and thereby effect an automatic operation of the totalizing devices, as in the manner earlier described.

Near the end of the rotation of shaft 52 (counterclockwise as viewed in FIG. 8) the surface 59'' of finger 59 will contact the hub of crank arm 55 and cause said finger to be rocked free of the total key 278.

*Automatic subtotal control means*

Means under control of the record carriage are also provided whereby a total taking cycle of operation may be converted to a subtotal cycle of operation, as in the following manner.

Loosely mounted upon the shaft 270 (FIG. 4) is a sleeve 261, on the left end of which is secured a rearwardly extending arm 262. Arm 262 is provided with a roller 263 positioned in the path of movement of a cam plate 264 fast to the program control bar 195 of the carriage. Fast to the right end of sleeve 261 is a downwardly extending arm 266 having link connection 281 with the lower end of a lever 282, fulcrumed to the machine frame at 283. The upper arm of lever 282 is provided with a projection 284 engaging a lug 285 of a latch 286 pivotally mounted at 287 to the framing of the machine. A suitable spring 288 holds lever 282 rocked in a counterclockwise position, as shown in FIG. 4, wherein projection 284 normally holds latch 286 upwardly out of cooperation with a stud 328' of the forward cam follower 328. In the tabulating movement of the record carriage to a given columnar position the suitably placed cam member 264 is adapted to engage and depress roller 263 prior to a related operation of the roller 245 by its cam shoe 267 in operating the total taking means. Depression of roller 263, therefore, through arm 262, the sleeve 261, arm 266, link 281 and the lever 282 will act to release latch 286 for clockwise movement under influence of a spring 289 so that as the forward cam follower 328 is caused to be subsequently rocked clockwise about its fulcrum 328'' by a forward movement of the cam arm 320, earlier described, latch 286 falls into engagement with the stud 328' to hold follower 328 out of cooperation with a return movement of cam arm 320. Cooperation of cam arms 316 and 320 with the cam followers 327, 328 act to control engagement of the accumulator wheels with the actuators 610 in the known manner earlier described with relation to FIG. 8 and it is sufficient to say that follower 328 is now held rocked in clockwise position by latch 286 out of cooperation with the rearward surface 320' of arm 320 in the return movement of said arm so that an active register will remain in engagement with the actuators 610 during their return movement and thus restore the totalized value back into the accumulator wheels.

*Power carriage return means*

Power means for returning the record carriage is provided, as described in the reference Patent 2,780,407 wherein an arm 315 (FIG. 8) secured to one end of a transverse square shaped shaft 199 is adapted, in a clockwise movement of said shaft, to tension a spring 317 secured to one end of a link 319. The opposite end of link 319 being pivotally connected at 322 to a latch 323, pivotally mounted upon a plate 329, fulcrumed at 330 to a suitable bracket fast to the machine framing.

Latch 323 is held by the tension of spring 317 against a stud 331 fast to a lever 163 mounted upon a transverse shaft 164. The lower end of lever 163 has link connection 162 with the arm 316, oscillated through link connection 108 by the motor driven crank arm 105, as earlier described. As lever 163 is rocked during the forward movement of cam 316, latch 323 is permitted, under influence of spring 317, to move into the path of a return movement of the stud 331.

Near the completion of the operating cycle of the machine, stud 331 will act to engage the hook end of latch 323 and rock plate 329 upwardly about its fulcrum 330.

Plate 329 has flexible link connection 332 with a clutch operating member 333 and, as plate 329 is rocked upwardly, link 332 will exert a twisting action to the clutch lever 333 whereby suitable projections 334 will tend to impart a lateral movement to suitable friction discs 335 to cause operation of the well-known carriage return clutch means. Operation of the carriage return clutch effects return movement of the platen carriage through means of a ribbon tape 336 one end of which is wound upon a drum 337 of said clutch while the other end is secured to an arm 338 (FIG. 18) fulcrumed upon the left end of the platen support shaft 339. The arm 338 is also adapted in an operation of the carriage return means to effect the throat opening of well-known front feed devices such as disclosed in the patents of reference.

A plurality of cam members suitably spaced upon the control bar 195 mounted within the carriage and plates are provided for cooperation with a roller 197 (FIGS. 4, 8) mounted upon an arm 198 fast to the square shaft 199, whereby to effect clockwise operations of said shaft for initiating carriage return movements; while other special cam means are also provided upon control bar 195 cooperable with roller 197 whereby to effect restoring of shaft 199 to terminate a carriage return movement in selective columnar positions, as in the manner and purpose hereinafter to be described.

While the known mechanical means and program devices associated therewith for effecting a selection and operation of the No. 1 and No. 2 registers above described may be expanded so as to include the control of additional registers, as in the four register machine illustrated in certain of the patents of reference, such a mechanical means is perforce limited as to the flexibility of register selection and in the number of registers capable of control thereby.

The present invention for accomplishing such a posting routine as to be hereinafter described, involving, inter alia, both an additive count of checks and of deposits and also a machine activity count for the day, provides for a novel arrangement of additional amount registers and related counter registers for cooperation with the No. 1 and No. 2 registers, together with special automatic control means therefor, as will now be described.

Special counter and amount registers

Figure 21:
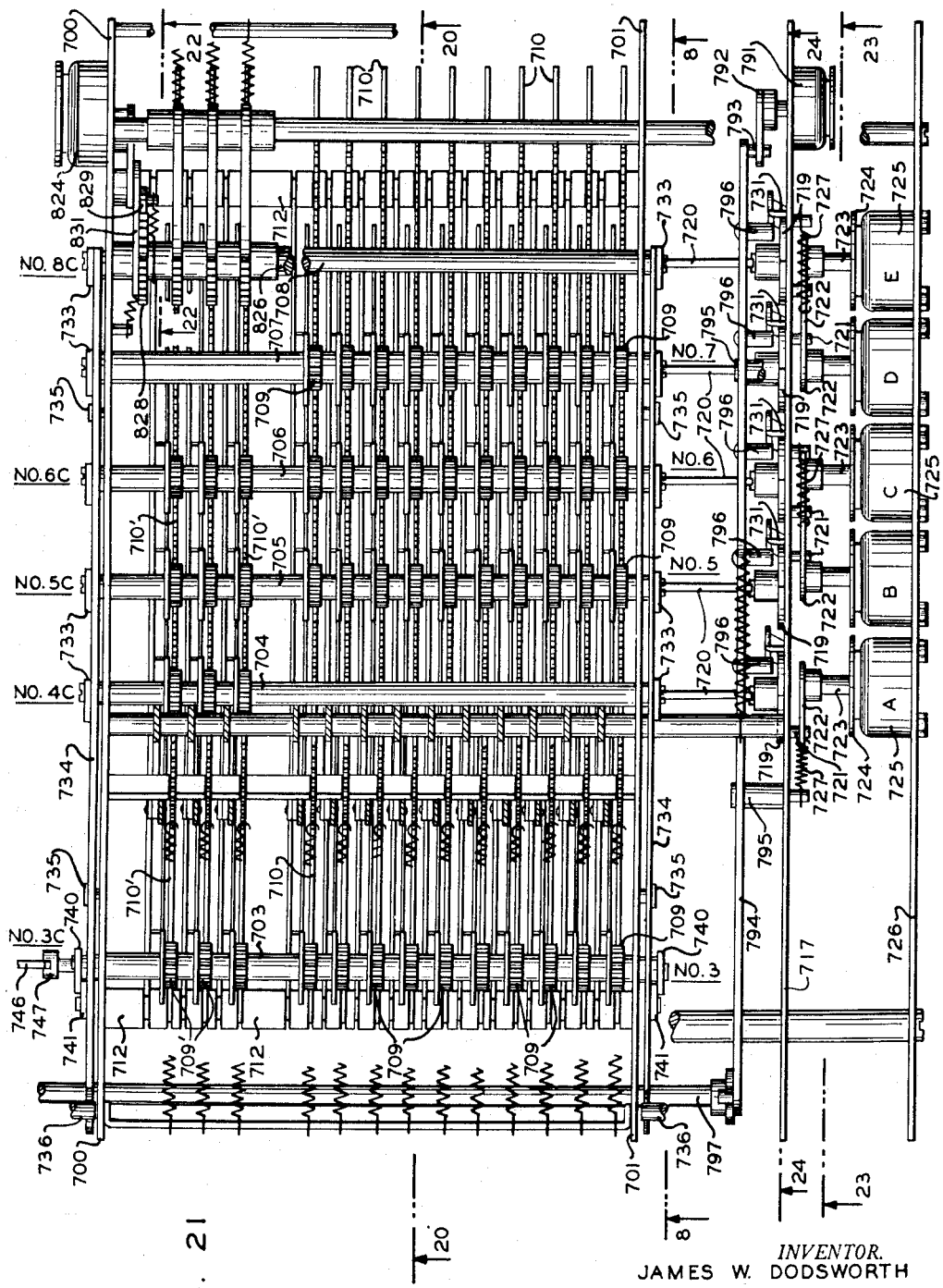
FIG. 21 is a plan view in cross-section taken substantially on line 21—21 of FIG. 20.

Dependent from the above described machine is a base section or unit including left and right side frame members 700—701 (FIGS. 20, 21). Mounted for rotatable movement and being vertically slidable in guide slots 702 of said frames are six transverse shafts 703 to 708 respectively. With the exception of shafts 704 and 708 there is grouped upon each shaft ten accumulator wheels, each group representing a ten place amount register of the crawl carry type and identified on the drawings as the No. 3, No. 5, No. 6, and No. 7 amount registers, the said registers being similar to the No. 1 and No. 2 amounts registers to which reference is made earlier in the specification.

To the left of the amount registers there is grouped upon each of said shafts with the exception of shaft 707 a similar type register, each however embodying only three accumulator wheels and being identified on the drawings as the No. 3C, No. 4C, No. 5C, No. 6C, and No. 8C counter registers.

At this time it may be stated that to the left of the tenth or highest order of the amount register wheel actuator levers 610 there is provided three similar actuator levers, numbered 610', each having pivotal connection with a related type bar 611'. No register wheels for the No. 1 and No. 2 amount registers are provided, however, opposite to the said actuator levers 610'.

Extending longitudinally of and adapted for selective engagement with the corresponding denominational order accumulator gear wheels 709 of the amount registers No. 3, No. 5, No. 6, and No. 7 are related order actuator rack slides 710. Said slides are supported at their forward and rearward ends by means of slotted openings 711 for engaging suitably notched guide bars 712 mounted within the side frames 700—701. An upper end of each slide 710 is provided with rack teeth 713 having engagement with related gears 714, loosely mounted upon a transverse shaft 609 and each said gear having engagement with a corresponding order of the amount register actuator levers 610. In like manner, each of the actuator levers 610' has similar intermediate gear connection with the corresponding order rack slides 710' which extend longitudinally of the three accumulator gear wheels 709' of the counter registers No. 3C, No. 4C, No. 5C, No. 6C, and No. 8C. Thus from the above description it will be observed that, the shaft 703 supports thereon both a ten place amount register, in line with the actuators 610 for the No. 1 and No. 2 amount registers, and to the left thereof also a three place counter register, in line with the racks 610', and that shaft 704 has no amount register thereon but supports a three place counter register which is to the left of all the amount registers, also that shafts 705 and 706 each support both an amount register and a counter register while the shaft 707 supports only a ten place amount register and the shaft 708 supports only a three place counter register. Individual spring members 716 connected one to each end of the respective shafts 703 to 708 serve to hold the related registers upwardly and normally out of engagement with the racks 710—710'.

Secured to the right side framing 701 is a subframe 717 having fast thereon a series of inwardly extending stub shafts 718 (FIG. 24) upon each of which is loosely mounted a cam disc 719. The hub portion of each disc 719 has universal type drive connection, by means of connecting links 720 (FIG. 21), with one end of a related one of the register shafts 704–708. Extending from each of the discs 719 is a drive pin 721, see also FIG. 23, having open end slot connection with a related operating lever 722, fast upon the left end portion of corresponding rock shafts 723. Shafts 723 each form part of the armature 724 of a related rotary type solenoid 725 of well-known structure, there being five of said solenoids fast upon a subframe 726 and arranged thereon in the manner as shown in FIGS. 21 and 23. Each of the cam discs 719 are biased in counterclockwise direction by means of individual springs 727 each connected to a related one of the said operating levers 722. Related to each of the cam discs 719 is a latch member 728 (FIG. 24), pivoted at 729 to the subframe 717 and being held in a clockwise position, against tension of their respective springs 730, by means of suitable lugs 731 thereon engaging with the peripheral edge of the related one of said cam discs 719.

Fast on each end of the register shafts 704–708 (FIGS. 8, 21) are corresponding cam collars 732 each having a flattened portion thereof normally in engagement with the underside of related cooperating cam blocks 733 fast upon a pair of slide members 734 mounted one each upon the left and right side frames 700–701 respectively through means of studs 735. When selectively energized, as in the manner hereinafter described, the active rotary magnet effects clockwise rotation to the related disc 719 and thereby to the collar cams 732 associated therewith. Upon rotation the active collar cams engage the related cam blocks 733 moving the corresponding register shaft downwardly to bring the gear wheels 709–709' thereon into engagement with the related racks 710–710'. During the above described clockwise operation of any disc 719 (FIG. 24) a notch 719' cut in the periphery thereof is brought into locking engagement with lug 731 of the related latch 728, whereby the related collar cam is held in its active condition until released in the manner to be hereinafter described. Each slide 734 (FIG. 8) has an open end slot connection with a related pin 736 fast to a downwardly extending pair of arms 737 secured one to each end of the fulcrum shaft 421 for the cam plates 419, adapted to the control of the No. 1 and No. 2 registers earlier described. It will be recalled that the cam plates 419 for additive operations are rocked during the first portion of a machine cycle, that is, before any movement of the actuators 610—610' occurs and are restored after the actuators reach their extreme forward position. Thus during such operations the shaft 421 is immediately rocked counterclockwise and the arms 737 will move slides 734 rearwardly to displace the cam blocks 733 from the collar cams 732 and thereby permit any active register set by the collar cams to be lifted free of the racks 710—710' by their related springs 716. Following the completion of a forward movement of the actuator racks a restoral of slides 734 will be effected by the return movement of shaft 421 and a suitable cam edge 733' on the blocks 733, engaging the higher peripheral surface of the active cam collar 732, re-engages the register with the actuators in time for the additive return operation thereof.

Registers No. 3, No. 3C on the shaft 703, however, are utilized in crossfooter operations and so must be adapted for registrations of both additive and subtractive character. Therefore on each end of shaft 703 is secured a collar having add and subtract cam portions 738—739. The add cams 738 extend rearwardly from shaft 703 and are in plane with related cam blocks 740 on the slides 734, while the subtract cams 739 extend forwardly and are adapted for cooperation with related cam blocks 741 mounted upon slides 734 forwardly of cams 739 and out of plane with the add control cams 738, 740. The said cams for the No. 3—3C register shaft 703 are controlled by special means as in the manner now to be described with reference to FIGS. 26–28.

Suitably mounted to the left side framing 700 of the aforesaid base section of the machine is a unit including a pair of laterally spaced end plates 742, 743. Fulcrumed at 744 for rotation upon plate 742 is a disc 745 having universal type link connection 746 with a slotted collar 747 (FIG. 21) secured to the left end of the shaft 703 in common to both the No. 3, No. 3C registers. Secured to said disc 745 is a pin 748 which extends leftwardly, through a suitable opening 749 of the plate 742, and above a pair of crossed arms 750, 751. Arm 750 is fast to the armature shaft 752 of a rotary type solenoid 753 secured upon plates 743 rightwardly of the pin 748, as viewed in FIG. 28 while lever 751 is secured to the armature shaft 754 of a similar type solenoid 755, mounted upon plate 743 leftwardly of the pin 748. Energizing of solenoid 753 is adapted to cause a clockwise operation of armature shaft 752 so that arm 750 engaging pin 748 rotates disc 745 and, through link 746, the register shaft 703 in a counterclockwise direction. Energizing of solenoid 755 however effects a counterblockwise operation to armature shaft 754 and the related arm 751 engages pin 748 to cause a clockwise rotation of the disc 745 and the register shaft 703. As viewed in FIG. 8, a counterclockwise rotation of shaft 703 will cause the collar cams 738 to engage the cam blocks 740, rocking shaft 703 downwardly to thereby immediately engage the accumulator gears for the No. 3—No. 3C registers with the corresponding racks 710—710' (FIGS. 20, 21). Said registers are thereby disposed for an additive operation in the movement of control plate 419, as in the manner fully set forth in connection with an additive operation relative to the other registers. In a clockwise operation of shaft 703 above described, however, cams 738 will rotate away from cam blocks 740 while cams 739 will rotate into the path of movement of the cam blocks 741. It will be recalled that in a first part of a machine cycle of operation the cam plates 419 displace slides 734 rearwardly. Thus cams 741 now engage the active cams 739 and will move the shaft 703 downwardly for engaging the register pinions thereon with the racks 710—710' prior to any movement thereof and upon a subsequent movement of the racks the accumulator wheels are rotated subtractively. Thereafter the slides 734 are restored in the first part of a return stroke of the machine cycle to disengage the active registers while permitting the racks to return idly, as is customary to a subtractive operation for such machines.

*Totalizing the lower registers*

For effecting total and subtotal operations of any of the lower registers No. 3—3C to No. 8C, cam plate 419 (FIG. 8) is operated as in the timed manner earlier set forth in connection with an operation thereof incident to operations of the total, subtotal keys 278, 278' for effecting totalizing operations of the No. 1 and No. 2 registers, said operations of said cam plate being well-known and fully set forth in the reference patents.

The lower registers No. 3—3C-No. 8C being also of the crawl carry type are zeroized by the successive release of the related actuators 610, 610' under control of toggle devices (FIGS. 3, 9–11) earlier described in relation to the totalizing of the upper registers No. 1 and No. 2. The connections between said lower registers and the said toggle devices are shown in FIGS. 3, 20, and 25, and operate as follows.

It will be recalled that an operation of either total key 278 or subtotal key 278' acts to effect the simultaneous release of the toggle latches 361, 361' shown in FIGS. 9–11 and related each to the releasing of the lower order actuator 610, 610' for the amount and for the counter registers respectively. At the same time operation of latches 361, 361' will act to release for clockwise operation the total hooks 613 (FIG. 3) of the adjacent higher order column for each of the said registers. Each of the total hooks 613 has pin and slot connection 500 with a related bell crank lever 501 loosely mounted upon a transverse shaft 502, supported within the framing of the upper base structure of the machine. A lower arm of each of said bell cranks 501 has pin and slot connection 503 (FIGS. 20, 25) with related bell crank levers 504 loosely mounted upon a transverse shaft 505, supported within the end framing of the unit housing the lower registers. Each of the bell crank levers 504 has link connection 506 with the forward one of a pair of bell cranks 507 loosely mounted upon support shafts 508, 509 respectively. The lower arms of the related bell cranks for each pair are connected together by means of corresponding links 510. Each of the pairs of bell cranks 507 also has pivotal connection 511 with a longitudinally extending bar 512, provided with a series of zeroizing stop teeth 513 cooperable with the zero stops 457' on the related order of the accumulator wheels for the corresponding registers No. 3—3C to No. 8C, as in the manner described for the total hooks 613 in relation to a totalizing of the No. 1 and No. 2 registers. Thus, upon the described tripping of the lower order of the actuators 610, 610' the related actuator slides 710, 710' are moved forwardly and will effect a clockwise operation to the lower order accumulator wheels for the particular amount and counter registers selected for totalizing. The successive release of the related total hooks 613 for each order are timed to operate the corresponding train 500, 501, 504, and link 506 for rocking the related pairs of bell crank levers 507 in clockwise direction in time to lift the zeroizing stops 513 into the path of movement of stop lugs 457' of the accumulator wheels of the lower registers prior to operation thereof by the release of racks 710, 710'. As each lower order accumulator wheel moves into engagement with the related stops 513 the corresponding lug 457' engages a rock pawl 514, pivoted at 515 upon the stop bar 512, and will impart thereto a counterclockwise rotation. Upon counterclockwise operation of pawl 514 a lug 514' on the lower end thereof engages a related projection 516 on a slide 517, supported upon studs 518 on the bar 512, and will impart a rearward movement to said slide. Slide 517 has pin and slot connection 519 with a lever 520, intermediately fulcrumed at 521 as shown in FIG. 25, and during said movement slide 517 acts to impart a counterclockwise movement to lever 520. The upper end of lever 520 has a lateral projection 520' engaging the rearward edge so as to impart upward movement to the push rod 373 (FIG. 3) adapted to the releasing of the next adjacent higher order of the toggle devices 361 utilized in effecting the zeroizing operations, as previously described.

The above described devices are provided relative to each of the accumulator wheels for each of the registers shown and it will be apparent from the foregoing description that operation of the related push rods 373 releases the adjacent one of the higher order toggle means for both the selected amount register and also for the account register selected therewith. Thus for each selected register a successive zeroizing will occur simultaneously in part, until the counter register completes its totalizing operation. However, as previously described, the subsequent printing cycle of operation is dependent upon both an amount and an account register completing their respective zeroizing operations.

*Carriage control for lower registers*

The electromagnets 725, 753, and 755 are adapted to be selectively energized in accordance with the columnar positions of the record carriage, whereby to effect a control of the related registers for a given posting routine, such as that illustrated in FIG. 2, to be hereinafter described. Special circuit control means for the said electromagnets are provided which include a plurality of gang switches 756 (FIG. 29) mounted upon a fixed bar 757, extending transversely of the rearward end of the machine, said switches being numbered 756A–756I as shown in FIGS. 1–1A. Each of said switches is slidably mounted for adjustment along the bar 757 and is locked in a selective columnar position, by means of set screws 758. Each of the gang switches 756 has an operating arm 759 pivoted thereto at 760 and which terminates at the upper end thereof as a cam element 761. A related spring leaf 762 engages each arm 759 above the pivot 760 whereby to hold said arms lightly against the forward contact member of the related switch 756 and to position the cam 761 into the path of movement of a cooperating roller 763, fast to a rearwardly extending arm of a lever 764, fulcrumed at 765 to a bracket 766 fast upon a cross tube 767 secured within the left and right side framing of the shiftable record carriage. A suitable spring 768 biases lever 764 counterclockwise against a limit stop 769 formed on the flanged bar 195 of the carriage, whereby roller 763 is held in a raised position for cooperation with the cams 761 in the carriage shifting operations related to the posting routine hereinafter described and utilizing the sets of gang switches 756 above described.

Preliminary to a further description of the mechanism and to the manner wherein operations of the amount registers are controlled selectively in combination with certain of the counter registers during a posting sequence of operations, a brief summary will be set forth at this time illustrating the particular columns of printed information desired and the selective combinations of register operation required in effecting a bank posting series of entries to which the invention is applicable, such as that illustrated with reference to the "Journal" and "Ledger" form sheets shown in FIG. 2.

*Crossfooter columns*

The journal and ledger sheets are first inserted within the shiftable record carriage in usual manner, the ledger sheet, however, in the present instance, being positioned forwardly of the right side of the journal sheet as shown, so that the first four leftmost columns of the journal are exposed to the printing type bars 611. It will be recalled that the printing columns are determined by a notched tabulating bar 1 on the carriage, and in the preferred embodiment shown said printing columns are, reading from left to right, as follows: the "Account Number," to which the carriage is positioned for the first entry; the next printing position, as the carriage moves to the left, is the "Proof Balance" column; then, in turn, the "Actual Balance" column; the "Zero Proof" column; and now also including the ledger form, the "Checks" column; the "Deposit" column; a "Date, Check Count, Actual Balance" column; a "Date, Check Count, Proof Balance" column and finally an "Items" column.

*Composite balance proof with entries to proper account*

It is usual practice heretofore when effecting a posting operation from suitable media to the journal and customer ledger accounts for an operator to first carry forward as a new balance to the journal sheet the last old balance amount as taken from the ledger, with said amount being entered additively within a given register. Thereafter at the end of a crossfooter series of posting operations the old balance is reposted and at this time is caused to be entered subtractively within the same register, which thereafter upon being totalized to zero confirms the correctness of the carried forward amounts, as in usual manner. Such an arrangement, however, would not preclude the operator from similarly misreading an old balance amount in effecting each such entry; nor will it detect if, in error, such a posting is made to the wrong account.

Applicant's program control of the registers provides for a composite proof which will confirm that such entries have not only been carried forwardly correctly but also that all entries are posted to the proper account, as will now be described in a general manner as relates to the composite proof to posting of the entries for the example illustrated in FIG. 2, and as hereinafter described in more detail with relation to the wiring diagram shown in FIGS. 1–1A.

With the carriage in the "Account Number" column the mechanical program means earlier described will act to condition the No. 2 register for a subtractive operation. At the same time the electromagnetic program devices will act to condition the No. 3 register for an additive operation. An account number 345, copies from the active ledger account, is now set up on the digit keys 215 appearing to the right on the keyboard and the motor bar 114 is then depressed. This sets the machine in operation for entering the account number subtractively into the No. 2 register and additively within the No. 3 register and to print said number as 3.45 upon the journal sheet. The carriage now automatically tabulates to the adjacent "Proof Balance" column. In this column the mechanical program means will condition the No. 2 register for an additive operation. The proof balance 503.45 is now noted from the last entry appearing in the "Proof Balance" column on the customer's ledger sheet and is set up on the digit keys 215 to the right. Motor bar 114 is again depressed, whereupon the amount 503.45 is printed upon the journal sheet and will be additively combined with the account number 3.45 previously subtracted from the No. 2 register, thereby leaving a registration of 500.00 stored therein. The carriage now tabulates to the adjacent "Actual Balance" column. An actual balance of 500.00 is noted from the last entry appearing in the "Actual Balance" column of the ledger and is set up on the digit keys 215 to the right and the operating key 114 is again depressed. In this column the mechanical program means will act not only to condition the No. 2 register for a subtractive operation but also for the purpose hereinafter described, to condition the No. 1 register for an additive operation. Thus at this time the actual balance amount 500.00 is printed upon the journal sheet and entered as a plus amount within the No. 1 register, while at the same time said amount will be combined subtractively with the stored registration of 500.00 previously appearing in the No. 2 register and will leave said register in a zero registration condition. The carriage next tabulates to the "Zero Proof" column and here an automatic subtotal of the No. 2 register, as again selected by the mechanical program devices, is effected by the automatic subtotal devices earlier set forth. If both the account number and the balance entries have been properly carried forward an appropriate zero printing would be effected at this time. An incorrect entry of either the account number or the balance amount, however, would be indicated by the printing of a significant value in the "Zero Proof" column, which value would be carried forward in the register and printed during subsequent posting operations in said column until detected by the operator. The operator thus through such visible error detection is then able to trace back to the source of error and make any indicated correction.

Thereafter successive check entries are subtracted from the actual balance of 500.00 appearing in register No. 1, while any deposit entries will be added therein. Following such entries the carriage then tabulates to the "Actual Balance" column of the ledger where an automatic total is now printed from the No. 1 register and at the same time said total will be transferred from the No. 1 register so as to accumulate with the account number 3.45 appearing within the No. 3 register. Thereafter the carriage tabulates to the "Proof Balance" column of the ledger where an automatic total operation clears register No. 3 and prints the combined amount represented by the actual balance plus the account number; the new amount again being the proof balance entry to be copied by the operator, as earlier described.

*Crossfooter posting routine with special registers and controls*

In the contemplated mode of operation for effecting a posting routine, such as herein set forth with relation to FIG. 2, certain of the amount and counter registers are selectively controlled by the electromagnetic program devices for operation in combination with the No. 1 and No. 2 registers of the mechanical program means, as will now be described with particular reference to the wiring diagram illustrated in FIGS. 1–1A.

It is recalled that for each columnar position to which the record carriage is tabulated during a posting routine operation there is provided a gang switch 756 (see also FIG. 29) operable by a roller 763 on the carriage, said switches being numbered 756A to 756I from right to left on the diagram. Each of said switches has a contact arm having circuit lead connection 771 respectively to a common terminal lead 772, which extends by means of a plurality of normally closed circuit switches 773–775 connected in series therein to the negative side of a power rectifier 776. Suitable on/off switch means 777 is also provided in said circuit and adapted when closed to supply negative power from source lead 778 to both the rectifier and to the electric motor 100, for which the normally open clutch switch means 110 earlier described is interposed in the positive circuit line 779. Thus, coincident with the described subtractive control of the No. 2 register by the mechanical program means, with the carriage in the "Account Number" columnar position roller 763 engages the first cam 761 and rocks the related arm 759 (FIG. 29) rearwardly to thereby close all the contacts of the switch 756A. Upon closure of switch 756A ground circuit is extended by means of lead lines 781 and 782 to one side of a normally closed snap switch 783A in series circuit with electromagnet 725A for the No. 4C counter register (see also FIGS. 21–24). The opposite side of said magnet having connection to positive service line 784, said magnet is immediately energized for rotating the related disc 719A and register shaft 704 (FIG. 8) to control selection of the No. 4C counter register for additive operation, as in the manner previously described. During said operation of disc 719A the latch 728A related thereto drops into engagement with the notch 719' and will lock the disc and register shaft in operated condition, while at the same time a lug 728' on the latch will act to open the snap switch 783A so as to immediately deenergize the solenoid 725A. It will be recalled, however, that the account number 3.45 as above entered within the No. 2 register was set up on the digit keys 215 to the right of the actuator levers 610', therefore at this time in this position of the carriage no entry will be effected upon the selected register No. 4C. Also special blocking means are provided which at this time prevent operation of the printing hammers 715' for the counter registers; unless said blocking means are released, as in the manner hereinafter to be described. It will be noted however that with the carriage in the "Account Number" column the register No. 4C is available for use, as in the manner and purpose to be hereinafter described with relation to the posting of a series of "Vertical Totals" to the instant posting program.

Upon a closure of switch 756A ground circuit is also extended from a second contact arm of the switch, by means of lead 785, to one side of a closed set of contacts 786A which comprise part of a relay switch means 786, operated in the manner and purpose as later to be described with reference to the said "Vertical Totals" operations. The opposite side of switch 786A continues lead 785 to the normally closed snap switch 783G in series circuit with the electromagnet 753 which operates disc 745 (FIG. 27) to control the No. 3—3C registers in a plus character of operation, as in the manner earlier described. As in the manner previously described for the No. 4C register control, a release of the related latch 728 to locking engagement with disc 745 opens the contacts of switch 783G for deenergizing the magnet 753. It will be noted that said operation of snap switch 783G to open position however effects also a closure thereof to a second contact arm of said switch for extending ground circuit therefrom, by means of lead 787, to one side of a normally open set of contacts 786H of the relay means 786, for the purpose to be hereinafter described.

Thus during the machine operation, following a depression of motor bar 114 (see FIG. 2), for an entering of the account number in subtractive manner upon the No. 2 register said number is caused also to be stored as an additive amount within the No. 3 amount register, for such subsequent uses as that earlier set forth, and others to be hereinafter described.

The record carriage at the end of the above machine cycle for the "Account No." column is now automatically tabulated in known manner to the adjacent "Proof Balance" Columnar position, whereupon roller 763 on the carriage releases contacts 756A and will subsequently close the contacts 756B related to the latter said carriage position. As illustrated in FIG. 2, for the "Proof Balance" column the mechanical program register No. 2 is selected for a plus operation and register 4C only is to be selected by the electromagnetic program devices. Upon closure of contacts 756B ground circuit is extended therefrom over lead line 788 to a set of normally closed contacts 786B of the relay switch 786 and thence continuing said lead 788 to the lead 782 for the snap switch 783A related to the electromagnet 725A. However, it is recalled that said switch 783A, and also the switch 783G, are still held in an open circuit condition, by the previously described locking operation of the respective cam discs 719, 745 with their related latches 728 (FIGS. 24, 27). Thus no immediate energizing of the electromagnet 725A will be effected at this time. It will be noted, however, that under such condition the related shafts 703, 704 for both the No. 4C and 3—3C registers are each latched in operated position at this time and that the program now calls for electromagnetic selection of the No. 4C register without operation of the No. 3—3C register. Special circuit controlled means are provided therefore adapted to the releasing of any non-selected register as in the following manner.

As earlier set forth there is included in series circuit with the terminal lead line 772 a normally closed snap switch 775, and it is recalled that a tabulating operation of the carriage acts to release a cyclic clutch means 24 (FIG. 15) for operating the shaft 56 of the mechanical program devices. Fast for rotation with shaft 56 is a cam member 589 adapted for rocking a bell crank lever 590 to cause a momentary operation of snap switch 775. During such operation ground circuit from service lead 772 is thereby opened to the carriage switches 756A–756I and will be closed to a lead line 790 for momentarily energizing a rotary solenoid 791 (see also FIGS. 21, 24), having the opposite pole thereof connected to the positive terminal lead line 784. To the armature of the said solenoid 791 is secured an upwardly extending arm 792 having pin and slot engagement 793 with a slide 794 supported upon studs 795 on the side frame 717. Upon the above energizing of solenoid 791, during an operation of the clutch 24, as released by the carriage shift operation, arm 792 moves slide 794 rearwardly and suitably spaced pins 796 on said slide will act to engage and restore any of the operated latch members 728 from engagement with the notches 719' of the corresponding discs 719A–719E. Rearward movement of said slide 794 also imparts a clockwise movement to a transverse shaft 797, whereby a rearward movement is effected to a lever 798 (FIGS. 26, 27) for similarly releasing the latch member 728 related to the disc 745 earlier described for the No. 3—3C register. It will be recalled that the release of any said discs permits a normalizing of the related register shafts and also restores to normal closed condition the related one of the snap switches 783A–783G. Thus, the above described energizing of solenoid 791 and consequent restoral of related latches 728 will act to release both of the operated discs 719A and 745 to permit the respective registers No. 4C and No. 3—3C to move free of engagement with the associated actuator racks 710, 710'. At the same time the described restoral of the related latches 728 for the said discs 719A, 745 also permits the two open snap switches 783A and 783G related to the said discs to restore to their normal closed circuit condition. It is recalled that tabulation of the record carriage has meanwhile released the switch member 756A to open circuit condition and has closed the contacts for the switch 756B. Thus the above closure of switch 783A will now immediately reenergize the solenoid 725A so that register No. 4C is again caused to be cammed into active relation with the actuator racks 710', while register No. 3—3C at this time remains out of engagement with the actuator racks. Thus, as illustrated by the register program selection for the second column of FIG. 2, registers No. 2 and No. 4C only are now rendered active for entries therein.

The amount 503.45, appearing as a last entry in the "Proof Balance" column of the ledger sheet, is now set up on keys 215 to the right side of the keyboard, and out of range with respect to the actuators for register 4C, and the machine cycle operating key 114 is depressed. During a consequent machine cycle of operation said amount is now entered additively upon the No. 2 register only, and the carriage thereafter tabulates to the adjacent "Actual Balance" columnar position. During said carriage tabulation the contacts 756B are released to ostensibly again normalize register No. 4C. However, a subsequent closure of contacts 756C by the said carriage tabulation acts to reassert ground circuit 772 through leads 799, 782, to the closed switch 783A. Thus upon the reclosing of the register restoring control switch 775 in the subsequent cyclic operation for hte mechanical program devices relative to a carriage shift to the "Actual Balance" column the solenoid 725A is reenergized and will reselect the said No. 4C register. At the same time said operation of the mechanical program devices now acts to select the No. 1 register for an additive character of operation and the No. 2 register for a subtractive operation, as in the known manner.

The amount 500.00, as copied from the previous last entry appearing in the "Actual Balance" column on the ledger, is now set up on the digit keys 215 to the right and upon operation of key 114 is additively entered upon the No. 1 register and subtractively upon the No. 2 register. As before, where no amount is set up on keys 215 to the left, no entry will be made within the programmed selected register No. 4C at this time and following the instant cycle of operation the carriage now tabulates to the adjacent "Zero Proof" column.

In connection with the above operation in the "Actual Balance" column, it may be desired that a previous total number of check counts, such as 35, is to be carried forward. In that event such an entry would be set up on keys 215 associated with the counter registers to the left of the amount registers and during the above described entry of 500.00 within the No. 1 and No. 2 registers said check count entry is now additively entered within the register 4C. It is desirable, however, not to print such total check count entry upon the record form at this time. Therefore, the following special blocking means is provided which normally prevent an operation of the printing hammers 715' related to the counter registers, except at such times as said blocking means is disabled through an operation of the total taking devices as in the manner as will now be described with particular reference to FIGS. 30–35.

Loosely mounted upon a transverse shaft 800 (FIG. 30) is a short bail 801 extending transversely of suitable forward projections 715" formed on the hammers 715' for the counter printing means. Said bail is biased counter-clockwise by a spring 802 but is normally held in a clockwise position, over the projections 715" for blocking the hammers 715', by means of lug 803' on the rearward arm 803 of a bail 804, loosely mounted upon a support shaft 805. Thus no printing of the number 35, representing a previous check count total, is effected during the above described operation relative to the "Actual Balance" column.

During a carriage tabulation from the "Actual Balance" to the "Zero Proof" column the ground circuit switch 756C is released from control of roller 763, to thereby open the circuit lead 799, 782 for magnet 725A, and the switch 756D is subsequently closed by said roller, whereupon ground circuit is now reestablished, by means of a lead 806, to the lead 782 and thence to the said magnet for again selecting register No. 4C. The control of the No. 4C register is effected also for the "Zero Proof" column, as in the manner previously described in relation to the preceding columns. At the same time in the "Zero Proof" column the No. 2 register is also called up to active condition by the mechanical program devices, as in the known manner earlier set forth.

For determining in this column the composite proof of entries earlier described an automatic subtotal operation of the No. 2 register is effected at this time, by means of the cam 267 on the flanged bar 195 (FIGS. 14, 18) of the carriage engaging the roller 245 to depress the lever 246, loosely mounted upon the shaft 270. Upon depression of lever 246 a lug 246' thereof acts to depress the lever 269 supporting the total taking roller 268 and will set the means earlier described with reference to FIG. 18 so that in this column the usual operation of the mechanical program clutch means 24 will result in effecting an automatic depression of the total key 278 for tripping off the successive totalizing means 361 earlier described with reference to FIGS. 9–11. At the same time the cam 264 on the bar 195 has depressed the roller 263 which sets the latch 286 (FIG. 4) so that at this time an automatic subtotal control of operation will result, as in the known manner heretofore described. It is noted from the above that in the present instance the amount register No. 2 and the counter register No. 4C are both called into engagement with their respective actuator racks 610, 710'. The novel arrangement of the registers in the present invention however permits the concurrent totalizing operation of the No. 4C counter register along with a totalizing operation of the No. 2 amount register. However, similar zeroizing means to the devices shown in FIGS. 9–11 for the amount registers must also be provided for the counter registers and it will be noted that downward movement of bail rod 355 by an operation of total key 278, as described for releasing the lower order toggle latch means 361 related to the amount registers, will also simultaneously release therewith a similar toggle latch related to the lower order of the counter registers. Also, it is to be noted that the highest order latch 361 for the counter registers similarly to the highest order latch for the amount registers has a connection 377' with a lever 378' fast to the control shaft 379 upon which is secured the lever 378 for releasing the operating lever 106 for the cyclic clutch means 103— 104. Thus in order to effect a total printing operation a counter and an amount register must be totalized conjointly.

In the "Zero Proof" column, therefore, the amount register No. 2 and the counter register No. 4C are both caused to be totalized and a subtotal printing cycle of operation is effected. During said operation a printing of the usual subtotal character together with a printing of the .00 symbol showing the registration condition of register No. 2 at this time will furnish composite proof means that not only have the entries been correctly made but have been applied also to the proper account number.

*Control of hammer blocks during totalizing operations*

It will be recalled that a check count value 35 carried forward was stored in register No. 4C during the preceding operation and that the printing hammers for the counter registers are normally blocked by the bail 801 (FIGS. 30, 35) to prevent operation thereof. So that printing from the counter registers may be normally effected during totalizing operations however the following means are provided for disabling the said blocking means 801 during total taking operations.

As fully disclosed in U.S. Patent 2,087,182, to which reference is made for details of structure and operation not herein set forth, a depression of the total key 278 serves to displace toward the right, as viewed from the front of the machine, the forward and rearward support frames 809 (FIG. 3) for the index bars 615. Pivoted at 808 to the rear support frame 809 is a pawl 807 (FIG. 33) adapted to be carried rightwardly therewith in the above operation so that a lug 810 of said pawl engaging a cam projection 811 of bail 804 will rock said bail in a clockwise direction (FIG. 33), counterclockwise as viewed in FIG. 31, said pawl being biased clockwise by a suitably strong spring 834. During said operation of bail 804 lug 803' of the arm 803 thereof is carried upwardly (to the broken line position) and away from the forward edge of blocking bail 801 for the counter printing hammers, earlier described. Upon upward movement of lug 803' the blocking bail 801, unless otherwise prevented, now moves forwardly under influence of its spring 802 and away from blocking position relative to projections 715" of said hammers. Thus the hammers 715' for the counter registers during a totalizing operation are freed for a subsequent tripping operation, as controlled by the well-known tripping fingers 812 (FIG. 3) which are rendered active by a displacement of the related type bars 611'. Said tripping fingers are displaced forwardly and returned by means of the reciprocatory movement of a common bail 813 during a machine cycle of operation, as in the well-known manner fully disclosed in the patents of reference.

In the above described rightward movement of pawl 807 the rightward end of said pawl is caused to be positioned above a lug 872 of an arm 873, pivotally mounted upon the shaft 874. The lug 810 of pawl 807 has also engagement with the left face (FIG. 33) of a collar 875, loosely mounted upon the support shaft 805 and is biased leftwardly by means of a suitable compression spring 876. During the described rightward movement of pawl 807, lug 810 moves collar 875 rightwardly and compresses the said spring 876. Upon an operation of the printing hammer release bail 813 (FIG. 3) said bail engages the lower edge of arm 873 (FIG. 34) and will rock said arm upwardly to impart a counterclockwise movement (FIG. 33) to the pawl 807. During said movement the lug 810 of said pawl is lifted above the collar 875 and spring 876 snaps the collar leftwardly under said lug, thereby holding the pawl in lifted position. Upon the described upward movement of lug 810 said lug releases the blocking bail 804 to permit an operation thereof by suitable spring means 877 (FIG. 30) whereby to recondition the blocking bail 801 for again disabling the counter printing hammers 715'.

As fully set forth in the above referred to patent, following a printing operation the frames 809 are restored leftwardly, and pawl 807 will be moved leftwardly therewith, off the collar 875 and into engagement again with the left end face of said collar. It may be noted that such an arrangement for holding pawl 807 and the lug 810 thereof upwardly free of the projection 811 of bail 804 acts to control the blocking of hammers 715' by bail 801 after the printing has been effected. Thus during the usual single cycle total taking operations such an arrangement permits printing of the total amounts. The above described blocking means however are necessary to the use wherein multiple machine cycles are used in the totalizing operation, such as for the printing of a true negative total amount in the well-known manner fully set forth in the reference patents. In such true negative total printing operations the described movement of frames 809 and pawl 807 provides for a counter printing to be effected in the first cycle of an overdraft series of operations, and it will be observed that lug 810 unless such suitable means as above described are provided would remain in engagement with projection 811 and thereby hold the blocking bail 801 released from hammers 715' during the interim control cycles of such operations. Thus, the hammers would be free to be tripped in an operation of bail 813 during each of the said control cycles and effect an undesirable multiple printing.

Operation of the printing hammers 715 related to the amount registers, however, are blocked until released during the final cycle of an overdraft operation.

As fully set forth in reference Patent 1,915,296, in a movement of the higher order actuator lever 610 (FIG. 32) from eight to nine printing position said lever engages a latch plate 144 and moves the same out of engagement with an arm 145 adapted for controlling the overdraft operations. The upper end of said arm engages a downwardly extending projection 146 of a lever 148 having yieldable spring connection 149 with a blocking bail 150, pivoted upon shaft 800 and extending transversely of rearwardly extending arms on the amount hammers 715 (FIG. 30). Thus in the normal position of the control arm 145 bail 150 is held away from the hammers 715. Upon release of arm 145 for an overdraft control operation, however, bail 150 is immediately rocked by lever 148, through means of a suitable spring 151, and will be positioned over the said arms of the amount hammers. The said hammers are thus blocked from operation until the bail 150 is subsequently released from blocking position by a restoral of control lever 145 during the final overdraft control cycle of operation, in the well-known manner.

In certain columns, as for the "Zero Proof" column above described, it may be undesirable to effect any printing from the counter registers during totalizing operations. Special means are provided therefore adapted as the carriage is positioned in such columns for superseding the above described control of blocking bail 801 by the total taking control means. It will be remembered, in connection with the description relative to FIG. 18, that automatic total operations are effected by depression of a roller 268 by a cam 267 on the carriage, whereby to adjust the lever 269 controlling the lever 276 of the automatic total means. In the present instance and referring also to FIG. 35, cam 267 in lieu of engaging roller 268 will now engage a roller 245 to depress a lever 246 pivoted upon shaft 270 and adjacent to the lever 269. Lever 246 has a lateral lug 246' extending above the control lever 269, so that depression of lever 246 acts also to depress the total taking control lever 269. A forwardly extending arm 247 of lever 246 has link connection 248 with a bell crank lever 249 pivoted upon the support shaft 800 for blocking bail 801. Upon depression of lever 246 link 248 is moved upwardly and will rock bell crank 249 in a clockwise direction, whereupon said bell crank engaging bail 801 will restore said bail, against tension of its spring 802, from the released position thereof effected by the total taking means earlier described with reference to FIG. 31, to again block the printing hammers 715' for the counter registers against operation.

In order that the counter register printing means may be used for listing only operations, such as hereinafter described with relation to the "Item" columnar position of the carriage, there is yet another special control means for disabling the normally effective blocking bail 801 from the hammers 715'.

With reference to FIG. 18, there is pivotally mounted at 878 to the left side frame of the machine a bell crank lever 879. The rearward arm of said lever has a lug 880 extending laterally across the top edge of the gear segments 75 of the known mechanical program means described earlier in relation to FIG. 16. It will be sufficient to say that for non-add operations the said segments are in the lowermost position and that for all other operations the segments are raised. Thus at any time both the registers No. 1 and No. 2 are caused to be set for non-add operations, the said bell crank 879 will be permitted a counterclockwise movement by means of a suitable spring 881. The upper arm of bell crank 879 has pin and slot connection 882 with the forward end of a link 883 pivotally connected at the rearward end thereof with a downwardly extending arm 884 fast to a transverse shaft 885. Fast upon the shaft 885 is a finger 886 (FIG. 34) and upon said counterclockwise movement of bell crank 879 link 883 is moved rearwardly thereby to effect a clockwise operation of shaft 885, as viewed in FIG. 18, and counterclockwise as viewed in FIG. 34. During said operation of shaft 885 finger 886 is rocked upwardly and will engage an arm 887 of the bail 804, rocking said bail counterclockwise and thereby displacing the lug 803' thereof to the dotted line position illustrated in FIG. 31. As earlier set forth displacement of lug 803' permits the bail 801 to be moved by its spring 802 out of blocking engagement with the hammers 715', so that the hammers are now free for printing operations under the above described circumstances.

Following an operation in the "Zero Proof" column the carriage will next tabulate to the "Checks" column on the ledger sheet, during which roller 763 (FIG. 1) releases switch member 756D for opening ground circuit 806 to the magnet 725A, but will immediately reestablish said circuit thereto, through circuit lead 814 and normally closed contact 786C, by effecting operation of the control switch 756E in the "Checks" column. Upon said closure of switch 756E ground circuit is now also extended from said switch, through lead line 815 and the normally closed contacts of snap switch 783B, to the magnet 725B for the No. 5—5C register. The opposite side of said magnet being connected to positive service line 784, said magnet is immediately energized for effecting engagement of said register with the actuator racks 710—710', as in the manner previously described. At the same time tabulation of the carriage to the "Checks" columnar position will cause the mechanical program devices to be operated for selecting the No. 1 register for subtractive operation. During said operation of the mechanical program devices the magnet 791 (see FIG. 24) is again momentarily energized, as heretofore described, and will act to release the latches 728 from the related discs 719 so as to restore any operated registers. In the present instance however magnet 725A for register No. 4C and magnet 725B for register No. 5—5C being energized at this time will hold the respective discs 719A and 719B in operated position, so that the respective latches 728 related thereto when released upon deenergizing of magnet 791 are caused to be reengaged therewith for locking the selected registers No. 4C and No. 5—5C in operated condition with respect to the actuators 710, 710'.

The first check entry is for 2000.00 and will be set upon the amount keys 215, following which an operation of the machine is effected by a manual depression of motor bar 114. During machine operation said amount will be entered subtractively within the No. 1 register by virtue of the mechanical program control, and as an additive amount within the No. 5 register by virtue of the electromagnetic program control thereof. During said operation special counter operating devices are adapted to cause an additive registration of 1 to be effected upon the No. 4C and the No. 5C counter registers, as will now be described with particular reference to FIGS. 16, 17 of the drawings.

Briefly, it may be said that said counter operating devices utilize means similar to the register selection program devices earlier set forth and fully disclosed in the U.S. Patent 1,946,572 of reference. It is recalled that upon an operation of the register selection clutch 24, as released by a movement of the record carriage in the manner earlier described, a rock arm 69 is moved first forwardly and is thereafter returned. During said movement a roller 72 thereon acts to cooperate with cam members 73, 74 in adjusting to different settings the related gear segments 75, each adapted for selectively operating the respective register control shafts in accordance with an adjustment of said cams as determined by the extent of movement permitted to the feelers 83 upon sensing various size orifices in the program tube 82.

Pivoted on the shaft 76 and adjacent to the right of said segments 75 is a similar segment member 75' which segment however has no register gear cooperable therewith. In the present "Checks" columnar position of the carriage a large orifice of program tube 82 is now opposite a feeler 83' related to controlling an adjustment of cams 73', 74', similar to the cams 73, 74, as follows.

During the forward movement of rocker 69 roller 72 moves free of engagement with cams 73', 74', and at the same time said rocker 69 will displace levers 93 therewith to rock the related whiffletree levers 86. One of said levers 86 has been adapted in the present machine to effect a rearward movement of the feeler 83' during said movement and said feeler is permitted a full rearward step of movement in entering the large orifice of program tube 82. Thus during forward movement of rocker 69 the projection 93' of the lever 93 related to feeler 83' is caused to be moved into engagement with surface 73" of the cam member 73' and will act to rock said cam upwardly against the stop 75" of lever 75'. Upward movement of cam 73' serves to position the lower cam edge thereof for cooperation with a return movement of roller 72. Thus as rock arm 69 is restored roller 72 engaging said surface will now act to raise the cam 74' a further step of movement and said cam, acting on an offset lug 75" of lever 75' will also impart an upward movement to said lever 75'.

Loosely mounted upon a cross shaft 77 is a lever 78 biased in a clockwise direction, by suitable spring means 79, against the lower edge of a rock plate 80, loosely mounted upon the cyclic rock shaft 164. Rock plate 80 is held in clockwise direction, against the tension of a suitable spring 81, by means of a lug 87 of said lever engaging the rearward edge of a crank arm 88 fast to the operating shaft 164. The rearward edge of the lever 78 is provided with indented shoulders 89 and 90 adapted for limiting any counterclockwise movements of rock plate 80, as hereinafter described, while the forward end of lever 78 has a lug 91 overlying the upper edge of segment lever 75'.

During the above described operation of lever 75' said lever, engaging lug 91, will impart a clockwise operation to lever 78 and will displace thereby the shoulder 89 downwardly away from cooperating position with rock plate 80. At the same time shoulder 90 of lever 78 is moved thereby to an active position for limiting a counterclockwise operation of rock plate 80 by spring 81, as arm 88 is moved away from lug 87 during a counterclockwise operation of rock shaft 164 incident to the above described machine cycle of operation for effecting check entries.

Loosely mounted upon the support shaft 229, and adjacent thereon to the zero column latch 214 related to the differential stop bar 615 for the lower order column of the counter registers No. 4C, No. 5C, is a pawl 92 having a projection 97 engaging an upper end of the rock plate 80. The rearwardly extending end of the pawl 92 is offset so as to engage the under edge of the said column latch and is normally held thereby so that the rearward edge of said pawl is out of the path of movement of the lug 615' of stop bar 615. During a machine cycle of operation in the "Checks" column position of the carriage, however, lever 78 now being in lowered position, an operation of shaft 164 permits plate 80 to rock counterclockwise under influence of spring 81 until stopped by engagement of said plate with shoulder 89 of lever 78. During said movement plate 80 engages projection 97 and will rock pawl 92 upwardly prior to any forward movement of the stop bar 615. Upward movement of pawl 92 will bring the rearward edge thereof forward of lug 615' while at the same time lifting the related column latch 214 free of said lug. It will be noted that pawl 92 is made shorter by one increment step of movement than is the length of the zero latch 214, whereby a subsequent movement of the stop bar 615 is now contro!'ed to effect a registration of 1.

Thus at the end of the present operation an amount of 2000.00 has been entered subtractively upon register No. 1 and additively upon register No. 5 while a check count of 1 has been effected additively upon both of the counter registers No. 4C, No. 5C, and the carriage now tabulates to a second "Checks" column position. In this position a check value in the amount of 1150.00 is entered by operating key 114 and, with the exception that ground circuit is now effected by closure of switch 756F by carriage roller 763 and that said roller has released the switch means 756E, the operation is the same as described for the previous check entry.

Figure 14:
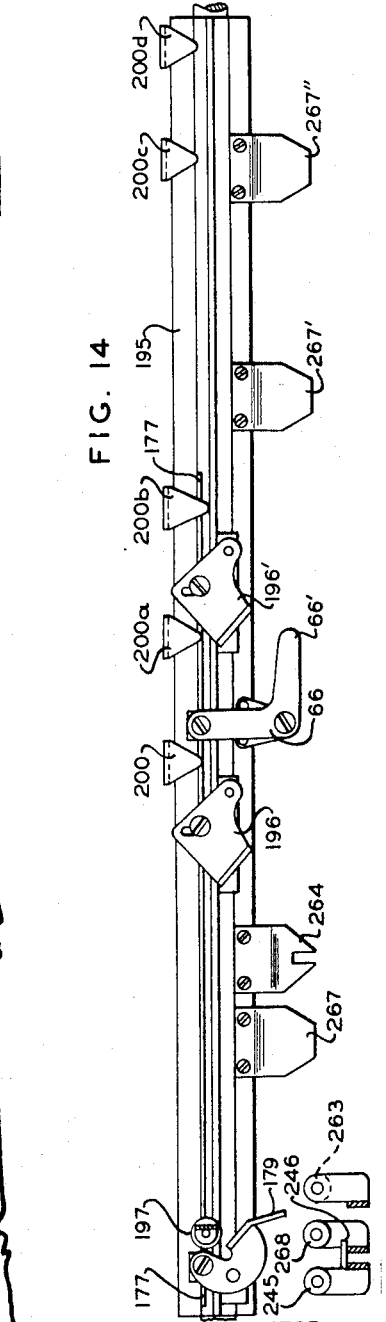
FIG. 14 is a front view of a transverse bar mounted within the carriage and supporting cam shoes for controlling various machine and carriage operations.

It is recalled that, as described with reference to FIG. 8, well-known power means will effect return movements of the record carriage and that said means are caused to be operated upon a clockwise movement of a square shaft 199 effected by downward movement of roller 197 by cam means suitably placed upon the control bar 195 (FIG. 14).

With the carriage in the second "Checks" entry column a cam 200 on bar 195 will depress roller 197 and upon completion of the machine cycle of operation the record carriage is now automatically returned until stopped in the first "Checks" column by a suitable cam member 196 which acts to restore roller 197 to raised position and thereby disable the power return means, as in the manner previously described. During such operation ground circuit for controlling the registers relative to the "Checks" columnar positions will now be relinquished by switch 756F and restored to the switch 756E by the return tabulating movement effected to the control roller 763.

At this time the operator in noting that the next check entry (1000.00) is to be a final check entry will effect said entry by means of a rearward movement to the skip column tabulating lever 231, earlier described. During a consequent operation of the machine incident to such operation of lever 231, both the check amount 1000.00 and a third count of 1 is effected upon the selected registers as in the manner fully set forth for the previous entries, following which the tabulating lever 7 (FIG. 13) is released for a tabulating movement of the carriage.

It will be recalled that in a rearward movement of the skip tabulating lever 231 a suitable latch plate 252 will act to maintain lever 7 in released position, so that the carriage will now continue its tabulating movement past the second of the "Checks" columnar position and until restoration of plate 252 by a pin 254, suitably positioned on tabulating bar 1, serves to terminate carriage shifting in the "Deposit" columnar position.

In this column a 5000.00 deposit is to be entered as a plus value in both registers No. 1 and No. 6, while a deposit entry count of 1 is to be entered upon counter register No. 6C. Therefore the mechanical program means upon being cycled following said movement of the carriage to the "Deposit" column will cause selection, in accordance with the program tube 82, of the No. 1 register for a plus operation. At this time the roller 761 has released contact switch 756F and will have closed the contact switch 756G, so that momentarily registers No. 1, No. 4C, No. 5—5C, and No. 6—6C are all caused to be selected for operation. During a cycle of operation for the mechanical program means, however, it is recalled that said means effects momentary operation of switch member 775 (FIGS. 1A, 15) for energizing solenoid 791 (FIG. 24) and that said solenoid will act to restore any registers previously set by the electromagnetic program selection. Thus at this time registers No. 4C and No. 5—5C will be restored to inactive condition. Circuit from lead line 816 of switch 756G to the normally closed switch 783C for magnet 725C will however maintain said magnet energized. Therefore the related register No. 6—6C and the corresponding locking disc 719C are held in operated condition, which permits a relatching of the related latch pawl 728 with the disc 719C for holding said registers in active condition, as in the manner earlier set forth.

For effecting an entry in the "Deposit" column a machine cycle of operation may be initiated by either a depression of the regular motor bar 114 or alternatively by a forward movement of the operating key 231 to the balance column control position. In either event the registering operation would be the same and both similar to the operations previously described with relation to the earlier entries. However, subsequent operation of the record carriage following each machine cycle of operation will be controlled in accordance with the selective operation of key 114 or lever 231 as follows:

With the record carriage in the "Deposit" columnar position a cam member 200a on the bar 195 will depress roller 197 so as to condition the carriage return means whereby following a machine cycle of operation initiated by motor bar 114 the carriage will be returned to the first "Checks" columnar position, as in the manner fully described with respect to the control by cam 200 in returning the carriage from the second "Checks" column.

If in lieu of returning to the "Checks" column the carriage is to tabulate from the "Deposit" to the adjacent "Actual Balance" column the operator would then initiate the machine operation by a forward operation of lever 231 to its balance column control position, earlier described with reference to FIG. 4. In order to disable the carriage return control called for by cam 200a at this time the forward operation of lever 231 is adapted to disable operation of the return clutch, in the following manner.

Upon a counterclockwise movement of the lever 207 incident to the operation of lever 231 the rearward edge 207' (FIG. 7) of said lever will engage and impart an upward movement to a lever 886, fulcrumed at 887. The forward end of lever 886 underlies a lug 888 of a slide member 889 held downwardly in the vertical guide slots 890 by spring means 891. In the upward movement of lever 886 slide 889 is moved upwardly therewith and will position a lateral projection 889' thereof adjacent the lower end 323' of the latch 323 of the carriage return clutch control means previously described in relation to FIG. 8. Thus said latch is now held downwardly and out of cooperation with the operating pin 331 in the rock arm 163 of the cyclic operated devices so that no operation of the return clutch is effected at this time. Upon release therefore the carriage will now tabulate, following a deposit entry, to the "Actual Balance" columnar position.

It is recalled that upon a forward movement to balance control position of lever 231 the tabulating detent 7 is caused to be latched free of tabulating bar 1 by not only the latch plate 252, as for a rearward movement of said lever, but also by a supplemental latch means 256, which engages and holds pin 255 rearwardly. During the above tabulation of the carriage a cam 200b will act to engage and depress roller 197 slightly lower to the movement imparted thereto by the cam members 200—200a. During said additional movement for roller 197 a pin 194' in an arm 194 on shaft 199 will act to rock latch 256 upwardly away from pin 255. Immediately thereafter a pin 254' on bar 1 acts to also restore latch plate 252, thereby releasing detent 7 in time for engagement with an appropriate notch 2 of bar 1 to locate the carriage at the "Actual Balance" columnar position.

In a like manner the carriage may also be tabulated directly to the "Actual Balance" position from both the "Checks" columnar positions upon selective operation of lever 231 forwardly for initiating an operation in effecting a check entry. In this instance the latch 252 would be tripped idly by pin 254 and subsequently released by cam 200b and pin 254′, as above described.

During the deposit entry (5000.00) upon registers No. 1 and No. 6 incident to the above machine operation a count of 1 will be effected upon the counter register No. 6C, as in the manner heretofore described with respect to obtaining a check count upon the selected registers for the "Checks" columns.

In the "Actual Balance" columnar position the mechanical program means effects selection of register No. 1 as for a plus operation. Meanwhile carriage roller 763 has released switch 756G to open the circuit from lead 816 to the magnet 725C for the No. 6—6C register and will have closed the adjacent switch 756H. Switch 756H is a gang switch adapted upon said closure to extend ground circuit for effecting the control of a plurality of registers and certain other means as will now be described.

One side of switch 756H has circuit connection for energizing electromagnet 725A for selecting the No. 4C register, through circuit lead 817, normally closed contacts of switch 786B, lead 788, 782 and the closed contacts of switch 783A. Another side of switch 756H has circuit connection, via lead 818, for energizing the magnet 755 controlling selection of the register No. 3—3C for a subtractive control operation, as in the manner earlier described for FIG. 21, said circuit connection passing through the normally closed switches 786D and 783F. A third side of switch 756H upon said closure will extend ground circuit for energizing an electromagnet 819 for the purpose to be hereinafter described. Said circuit comprises a lead 820, including the normally closed contact switch 786F therein, connected to the lead line 821 for said magnet. The final or fourth side of contact switch 756H upon closure of said switch will extend ground circuit therefrom by means of lead line 822, including the closed contacts of switch 786E, to one side of a normally open snap switch 823, adapted to be operated for energizing a rotary electromagnet 824. Said energizing of magnet 824 is adapted, as hereinafter described, for effecting an indexing operation to the No. 8 register for the purpose of registering therein a unit count of 1, whereby to signify the activity of the machine to the purpose of posting an account.

With particular reference to FIGS. 20–22, it will be recalled that the activity counter register No. 8 embodies three accumulator wheels supported at the left upon the register shaft 708. Gear wheels 709′ for each of said accumulator wheels are normally held upwardly and in mesh with a related gear wheel 825, the two leftmost of which are loosely mounted on a transverse shaft 826 while the gear to the right is fast with said shaft. Each of the said gears 825 are held by spring detent pawls 827 against rotation. Fast upon the left end of shaft 826 is a ratchet wheel 828 engageable by a drive pawl 829 pivotally mounted at 830 upon a lever 831, loosely mounted upon shaft 826. Lever 831 has pin and slot connection 832 with an arm 833 fast to the armature shaft 834 of magnet 824. Upon the above described energizing of magnet 824 said magnet will rock arm 833 in a counterclockwise direction (FIG. 22) and said arm rocks lever 831 clockwise to advance pawl 829 sufficiently for indexing ratchet wheel 828 and shaft 826 one step of movement in the clockwise direction. Said clockwise movement of shaft 826 rotates therewith the rightmost gear wheel 825 one tooth step of movement which thereby rotates the related accumulator wheel gear 709′ in counterclockwise direction for effecting a registration of 1 upon the accumulator wheel. It will be remembered, however, that the circuit lead 822 for the above activity counter magnet 824, at the time switch 756H is closed by the carriage movement to the "Actual Balance" column, includes a normally open contact switch 823. Thus no count will be effected unless said switch is also caused to be closed, as in the following manner.

Secured upon transverse bar 195 (FIG. 14) of the carriage is a cam member 267′ adapted with the carriage in the present position for depressing roller 268 to cause an automatic operation of the total key 278 (FIG. 8) and effect a totalizing operation, as in the manner previously described for the similar cam member 267 related to the "Zero Proof" columnar position of the carriage. Upon depression of the total key 278 a pin 835 (FIG. 4) in said key will act to engage an arm 836 of switch 823 to effect a closure of the contacts thereof and thereby completes the circuit to magnet 824 (FIG. 22), which thereupon effects the activity count upon the register No. 8, as above described. Meanwhile the above depression of total key 278 has also tripped the totalizer devices for zeroizing both the No. 1 and the No. 4C registers, as in the manner fully described earlier in the specification with relation to FIGS. 9–11. At the end of said zeroizing operations and with the related actuators in their forward positions for positioning the type bars 611–611′ the machine is tripped for a cycle of operation wherein the printing hammers are tripped so as to print the actual balance total (1350.00) stored in register No. 1 and the total of the check count (3) from register No. 4C upon the record sheet.

As in the well-known manner set forth in the patents of reference the cam plate 419 for total taking operations is rocked upwardly in a first part of the return movement of cam arm 320, i.e., before a return movement of the actuator levers 610. And it is recalled that magnet 755 has also been energized through contact lead 817 and when energized acts to rock the cam collars 739 (FIG. 8) into the path of movement of cam block 741. Thus upon said rocking of cam plate 419 slide 734 is moved rearwardly and will act to engage the No. 3—3C registers with the racks 710 while said racks are in their forward position. Upon the subsequent return stroke of the machine cycle therefore the amounts as zeroized from the No. 1 register are transferred to the No. 3 register while amounts in the No. 4C counter register will be transferred to the No. 3C counter register at this time for subsequent use, as will be hereinafter described.

In the present posting series of operations it is desirable that totalizing operations, whether manual or automatic, be limited to operation in specific columnar positions only of the carriage. Therefore the following means are provided which act to lock up the total key against operation unless released, as in the manner now to be described.

As shown in FIG. 1, there is mounted to the underside of the keyboard plate a slide member 840 normally held in a rightward position by a suitable spring 841, so that the rightward end of said slide is positioned beneath suitable shoulders of the usual total, subtotal keys 278, 278′, locking said keys in normal upward position. The opposite end of said slide has a rearwardly extending arm 842 (FIGS. 18, 19) engaging the upwardly extending arm 843′ of a bell crank lever 843, pivotally mounted at 844 upon a bracket 845 fast to the left end plate of the keyboard. The lower arm of bell crank 843 has a lug 846 engaging a lug 847′ on the upper end of a slide member 847 (FIG. 16) guided for upward and downward movement in suitable guide slots formed in the support studs 849, fast to the inside wall of the left side framing of the machine. The lower end of slide member 847 has a lateral projection 850 engageable with the lower side of the hub portion of the control pinion 133 related to the operations of the register shaft for the No. 2 register, by the mechanical program means earlier described. At such times, and only such times, as the No. 2 register is adjusted for selection in a plus character of operation by the said program means will a flattened portion 133′ of the hub portion of gear 133 be in cooperating position with projection 850. Therefore at only such times will the slide member 847 be permitted an upward movement, by means of spring 851. Upward movement of slide 847 by engagement with lug 846 serves to rock bell crank 843 and will move slide 840 leftwardly (FIG. 1) so that at this time, i.e., when the No. 2 register is set for plus operation, the total and subtotal keys 278, 278' are unlocked. For any operations other than that stated above control pinion 133 will be rotated so that the hub of said pinion will have depressed slide 847 and will permit thereby the slide 840 to move rightwardly under influence of its spring 841 to again lock up the keys 278, 278'. Thus for the automatic totalizing operation related to the "Zero Proof" column heretofore described, the program in calling for a plus control for the No. 2 register at that time will have unlocked the total, subtotal keys so as to permit the described operation thereof.

In the present instance, with the carriage in the "Actual Balance" columnar position, the register No. 2 is not called for and the said locking means would therefore be in its locking position. Special magnetic control means for releasing said lock at this time are provided, however, as follows.

It is recalled that in the present columnar position of the carriage the closure of switch 756H has extended circuit through leads 820, 821 for energizing an electromagnet 819. Said magnet is of the rotary type and is secured to the left side framing of the machine as shown in FIGS. 18, 19. Fast to the armature shaft 852 of said magnet is a forwardly extending arm 853 having yieldable spring connection 854 with the bell crank lever 843. Thus upon the above describe deenergizing of magnet 819 said magnet will rock arm 853 downwardly and will tension spring 854 for rocking bell crank 843 whereby to move slide 840 (FIG. 1) leftwardly and thus free the total, subtotal keys for the operation above described for the "Actual Balance" column position.

Following the machine cycle of operation the carriage now tabulates to the "Balance Proof" columnar position and in this column a cam 267" will act to depress roller 268 for effecting an automatic totalizing operation, as in the manner earlier described for operation of said roller by the cam member 267'. Tabulation of the record carriage from the "Actual Balance" to the "Proof Balance" columnar position will also cause carriage roller 763 to reelase the above described circuits from control switch 756H and will engage the contacts of switch 756I, related to the "Proof Balance" carriage position. Again, as for each carriage tabulating operation the mechanical program clutch 24 (FIG. 15) being tripped for operation will effect operation of switch member 775 for energizing magnet 791 (FIG. 24), which as described earlier, operates slide 794 for releasing the previously controlled register settings. At this time, however, a circuit lead 856 from switch 756I, extending through normally closed contacts of switch 783G, to magnet 753 (see FIG. 28), will energize said magnet for controlling a plus selection of the registers No. 3–3C. However, operation of the total key will act to modify the plus control of said registers to a subtractive control operation, as is customary for the total taking operations. At this time therefore a total of the combined amounts (3.45) earlier stored therein during an operation related to the "Account No." column and the checks total (1350.00) transferred therein during the "Actual Balance" column operation is now caused to be printed upon the ledger sheet, in the usual manner during the related machine cycle of operation.

From the "Proof Balance" column position the record carriage is to be returned to the initial or "Account No." column position. Secured to the transverse bar 195, therefore, is a carriage return control cam 200c which, in this position of the carriage, holds the roller 197 in depressed position. Thus, following the printing cycle of operation the return clutch means 333 (FIG. 8) earlier described will now be operated to cause an automatic return operation of the carriage, until said movement is terminated by disengagement of latch 323 from pin 331 upon restoration of roller 197 upwardly by engagement with a cam member 179 cooperable therewith in the "Account No." columnar position.

It will be recalled that roller 197 is adapted to be lifted also by the cam means 196 with reference to terminating a return movement of the carriage in the "Checks" column position. Also, for the purpose hereinafter to be described, a similar cam 196' serves for terminating a return operation of the carriage in the "Deposit" column position. In order to permit the carriage to return without interruption therefore certain means are provided, similar to that as described in U.S. Patent 2,780,407, whereby said cams at this time are rocked downwardly for non-cooperation with roller 197.

As shown in FIG. 14, each of the cams 179, 196 and 196' are pivotally mounted on bar 195 and are interconnected by means of a tie rod 177, in similar manner to that as set forth in the said Patent 2,780,407. The rightward end of tie rod 177, as viewed in FIG. 14, has suitable connection with an upwardly extending arm of a bell crank lever 66, also pivoted to the bar 195. The rightward end 66' of lever 66, with the carriage in the "Proof Balance" columnar position, is brought over the rearward end 65' of a bell crank lever 65 (FIG. 29), loosely mounted upon the shaft 270 supported in the base portion of the machine. During a machine cycle of operation incident to a totalizing printing operation bell crank lever 65 will be rocked upwardly, in the manner as set forth in the above patent, so that end 65' thereof will engage and rock lever 66 counterclockwise (FIGS. 2, 14), thereby imparting a leftward movement to tie rod 177. Upon said movement of tie rod 177 cam 179 is rocked upwardly, to the dotted line position illustrated by the diagram in FIG. 2, and the cams 196, 196' are both rocked downwardly to the dotted line position illustrated therein. Said cams 196, 196' during carriage return movement will now move past roller 197 freely of engagement therewith. Near the end of the return movement of the carriage cam 179 engages roller 197 and is caused to be rocked downwardly, thereby restoring tie rod 177 rightwardly to reset cams 196, 196', and thereafter roller 197 is caused to be cammed upwardly for terminating the carriage return movement. A normally closed snap switch 774 (FIGS. 1A, 8) in the negative service line 772 for the series of contact switches 756A–I will be opened by the described operations of the return clutch control means, whereby to avoid unnecessary circuit closures while the carriage is being operated in return movement.

*Special operation for the shift control lever*

In the above described series of operations the shift control lever 231 (FIGS. 4–6) when operated in relation to the "Deposit" column entries is moved forwardly and is immediately released. The succeeding entries following such operation have been automatic and it is frequently required that special entries (30) be printed upon the record sheet prior to such automatic entries and in a columnar position "Item" which is subsequent to the said automatic entry columnar positions. Under such conditions the shift control lever is operated forwardly but will now be manually held in the forward position, in lieu of being immediately released.

With reference to FIG. 5, mounted to be freely slidable upon the pivot studs 229 and 230 is a slide 858 having relaxed spring connection 859 with a lever 860 pivoted upon the stud 202 for the bell crank lever 234. Lever 860 has a lug 861 engaging the forward edge of bell crank 234 and upon a counterclockwise movement of said bell crank in the forward operation of control lever 231, lever 860 is moved counterclockwise therewith and will tension spring 859 to bias slide 858 in forward direction. The upper edge of slide 858 is provided with a tooth 862 adapted during the above operation to be brought into frictional engagement with a pin 863 in the lever 212 of the skip tabulating control means earlier described. It will be recalled that in an operation controlled by a forward movement of lever 231 the lever 212 is caused to be rocked counterclockwise, until latched by means of a latch plate 252 (FIGS. 4, 13) and also by means of a second latch 256. Both of said latches are released, however, as the record carriage tabulates between the "Deposit" and "Actual Balance" columnar positions, by virtue of the cam means 200b and pin 254', which would ordinarily stop the carriage in the "Actual Balance" position, as previously described.

In the present instance, however, so long as lever 231 is held forwardly tooth 862, by the frictional engagement thereof with pin 863, will act to hold the latch 212 and thereby the tabulating detent 7 free of engagement with tabulating bar 1. Thus the carriage will now tabulate past the "Actual Balance" and the "Proof Balance" columnar positions and until stopped in the "Item" column position by engagement of detent 7 with a block 864 appropriately placed on the bar 1. It will be noted that the upper forward edge of hook 862 is made radial about pivot stud 212, while the lower portion thereof is undercut slightly to assist the frictional engagement of pin 863 for holding the lever 212 and detent 7 in the operated position.

For the "Item" column a printing only is required and therefore an operation of the mechanical program clutch 24, (FIG. 12) when tripped by the carriage movement, will now act to adjust any previously active set registers to the non-add condition. Operation of clutch 24 it is recalled engages switch 775 for momentarily energizing magnet 791 (see FIG. 24) for normalizing the registers controlled by the electromagnetic means. The carriage having tabulated beyond the final control switch 756I and whereby all the control circuits are now open the control magnets 725A to 725E for the registers in the lower unit will remain deenergized and no registers of said unit will be called up for operation at this time.

The operator has a choice for effecting item entries by either an operation of motor key 114 or alternatively by an operation of a special "Balance Return" key 865, whereby the carriage is selectively returned thereafter automatically to either the "Deposit" or to the "Actual Balance" column in accordance with the selected key, as will now be described.

In the "Item" column position a cam 209d engaging roller 197 rocks the carriage return control shaft 199, to spring tension latch means 323 (FIG. 8), and at the same time will act to restore latch 256, as in known manner.

If an entry to be printed in the "Item" column is effected by means of the regular motor bar 114, the engagement of latch 323 with pin 331 during the machine cycle effects operation of the return clutch 333, as in the manner previously described. The carriage in this instance will continue in a return operation past the "Actual Balance" column and until roller 197 is restored by means of the cam member 196' placed upon bar 195 in relation to the "Deposit" columnar position. Thus it is possible to effect a series of shuttle operations between the "Deposit" and "Item" columnar positions prior to the successive automatic operations related to the "Actual Balance" and "Proof Balance" columns, from which the carriage subsequently is automatically returned to the initial "Account No." columnar position, as earlier set forth.

Following such shuttle operations, or in lieu thereof, the carriage may be returned from the "Item" columnar position upon operation of the special (Balance Return) key 865, as will now be described with reference to FIG. 36.

Key 865 is pivotally mounted at 894 to the right side frame and is provided with a projection 895 having engagement with the pin 224 in the stem of the machine operating bar 114, so that upon depression of key 865, bar 114 is also depressed to release the cyclic clutch means 103—104. The rearward end of key 865 has yieldable connection 896 with a rearwardly extending lever 897 pivotally mounted at 898. The rearward end of lever 897 has pin and slot connection 899 with an upwardly extending slide 900, suitably mounted by pin and slot means to the rearward frame of the machine. The upper edge of slide 900 is adapted for engagement with the lower edge of the lever 212 which controls operation of the carriage tabulating detent lever 7, earlier described. The lower end of slide 900 has a shoulder 900' which, with said slide in normal downward position, is lower than the top edge of a rearward projection 901' of a slide member 901. Slide 901 is mounted upon studs 902 in the machine side frame and is adapted to be held forwardly, against tension of a suitable spring 903, by engagement of the forward edge of lever 194 with a lug 904 of said slide. Lever 194 is fast to the carriage return control shaft 199 and with the carriage in the "Item" columnar position said shaft is rocked into clockwise position by depression of roller 197 by the cam 200d, as above described. It is recalled that shaft 199 is held rocked throughout carriage return movement until release of a latch 323 (FIG. 8) from pin 331 is effected by the restoral of roller 197, through means of the cam 196' in the "Deposit" columnar position. The above clockwise operation of shaft 199 and lever 194 thereon permits the end 901' of slide 901 to engage the forward face of slide 900, above the shoulder 900' and upon the depression of key 865, lever 897 is rocked upwardly whereby to lift slide 900 sufficiently so that end 901' of slide 901 will snap under the shoulder 900' and hold slide 900 in a raised position. During the described upward movement of slide 900 the upper edge thereof engages lever 212 and rocks said lever for releasing the detent 7 (FIG. 13) from tabulating bar 1, while at the same time permitting the latch plate 252 to rock under the projection 212' for holding said detent in the released position. Thus following an entry in the "Item" column by means of the "Balance Return" key 865 the carriage will now automatically return leftward to the "Deposit" columnar position. However, a restoral of roller 197 by the cam member 196' causes shaft 199 and arm 194 to release slide 901 from shoulder 900' while disengaging also the latch 323 (FIG. 8) from pin 331. Disengagement of latch 323 from pin 331 acts to termnate the leftward return movement of the carriage and permits the carriage to immediately tabulate toward the right, whereupon the pin 254' will act to release latch plate 252 in time for the detent pawl 7 to engage with the tabulating bar 1 and stop the carriage at the "Actual Balance" columnar position. Thereafter the automatic totalizing operations relative to both the "Actual Balance" and the "Proof Balance" columns followed by an automatic return to the initial lefthand or "Account Number" column will be accomplished as in the manner previously set forth.

*Successive automatic vertical column totals*

With the carriage now again positioned in the first or "Account Number" columnar position the operator, noting that a final posting series of operations has been completed, will initiate an automatic vertical total series of operations by moving rearwardly the vertical total lever 385 (FIGS. 16, 18). A rearward setting of lever 385 will initiate a register selection cycle of clutch 24, adjust means to effect tripping of the successive totalizing devices and will adjust the mechanical program devices, all as in the manner more fully set forth in the U.S. Patents 2,134,280 and 2,756,926 of reference.

Briefly, rearward movement of lever 385 will adjust suitable stops 383 downwardly, said stops subsequently cooperating with projections 389 to limit any control operation of links 96 and modify thereby the control thereof, as exercised by the program tube 82, for controlling operation of the mechanical program devices earlier described with relation to FIG. 16. Thus at this time an operation of register selection clutch 24 will select register No. 2 as for an additive character of operation, in lieu of the subtractive character selection of said register for the crossfooter operation earlier set forth. To release clutch 24 for operation a rearward movement of lever 385 will act to impart clockwise movement to a bell crank lever 393 (FIG. 18) and, by means of link connection 395, also counterclockwise movement to a bail 397, loosely mounted upon the shaft 270. One end of bail 397 extends beneath a bell crank 399 (FIG. 15) and imparts thereby a counterclockwise movement to said bell crank. Upon said movement a pin 401 of the bell crank 399 will move a slide member 404 leftward whereby said slide engaging a pin 406 trips release lever 27 from clutch control plate 33. Plate 33 thereupon moving upwardly will release clutch 24, as in the known manner previously described.

As fully described in the above Patent 2,756,926 operation of bell crank 393 (FIG. 18) by a rearward movement of vertical total lever 385 serves to rock the lever 273 for releasing a pawl 276, whereby the above operation of the register selection devices will act to cause a depression of the total key 278 for releasing the successive totalizing means and to adjust the register control means of FIG. 8, as in the manner fully set forth earlier in the specification.

At this time it may be well to recall to mind that in effecting totalizing operations relative to the devices of the present disclosure both an amount register and a counter register are required to be selected for concurrent operation; in order to effect a release of the cyclic clutch means 103—104 (FIG. 4) whereby to cycle the machine for printing a total. Means whereby an operation of lever 385 will act also to modify the program of selection and operation of the electromagnetically controlled registers in the lower unit are also provided, as will now be described.

Secured to the left side frame of the machine is a snap switch 386 (FIG. 18) the contacts of which, as shown in FIG. 1A, are in their open position when lever 385 is in normal forward position. Upon a rearward setting of lever 385 said lever engages the control arm 386' of said switch and will act to close the contacts thereof. Upon said closure of switch 386 ground circuit from negative service line 772 is now extended to the relay switch member 786. The opposite side of said relay is connected to plus service line 784, so that said relay is now energized and will act to open all the contact members 786A–786G of the circuits described in relation to the crossfooter posting series of operations. At the same time said relay will close the contacts of the switch 786H and also a second pair of contacts forming a part of the switch member 786B, for the purpose to be hereinafter described.

Thus, at this time with the carriage in the "Account No." position switch 756A is again closed, but the circuit from lead 785 is now broken at switch 786A. Circuit from lead 781 is again, however, extended by means of lead line 782, to control a selection of the No. 4C counter register, as in the manner previously described, so that now both an amount register (No. 2) and a counter register (No. 4C) are active for totalizing as illustrated diagrammatically with relation to FIG. 2A. No amounts are at this time stored within either of said registers and the operation is for merely printing the usual .00 and total symbol and for the purpose of affecting the usual automatic carriage tabulation to the adjacent "Proof Balance" columnar position. As described for the crossfooter series of operations it may be noted that operation of the program clutch 24 at any time engages the switch 775 for energizing magnet 791 of the register resetting means described earlier in relation to FIG. 24. Also it will be noted that suitable diodes 855 (FIG. 1A) may be placed wherever needed, such as in the circuit lead 788, whereby to prevent any back circuits which might otherwise cause a misoperation.

As before, during carriage shifting roller 763 has now released switch 756A and has closed the contacts for switch 756B to effect a change of register selection in the lower unit as will be described; while operation of clutch 24 again selects the No. 2 register for plus character of operation. Switch 786B having been operated by relay 786 has now opened the circuit lead 788 from switch 756B and has closed said circuit lead to a lead 866 extending through the closed contacts of switch 783E to the electromagnet 725E for controlling selection of the No. 8C counter register.

It will be recalled that counter register No. 8C during the crossfooter operations was selected for operation and indexed whereby to store thereon an activity count of the use of the machine. Said operation occurring at the time a totalizing operation was effected with the carriage in the "Actual Balance" position relative to the ledger sheet. While such a count is adapted to be made at that time it will be noted that the vertical total of said activity count may be taken at some other selected columnar position of the carriage. Both an amount register No. 2 and the counter register No. 8C are automatically totalized at this time and the activity count total (illustrated as 1) from register No. 8C is printed upon the "Proof Balance" column of the journal sheet. Register No. 2 has no amount stored therein and again is brought into operation at this time for the purpose of completing the total printing cycle control. At the completion of the total printing cycle the carriage now tabulates to the adjacent "Actual Balance" columnar position, releasing the control switch 756B and closing the contacts of switch 756C.

In the "Actual Balance" column no vertical total amounts are to be printed; however, to carry the automatic total operations through to the next columnar position the above closure of switch 756C selects the counter register No. 4C for operation. At the same time the mechanical program means will call up the No. 2 register. The subsequent printing cycle of operation incident to the totalizing operation in this column merely prints the usual .00 and total symbol whereafter the carriage then shifts to the adjacent or "Zero Proof" column.

During the said carriage shift operation switch 756C is released and switch 756D is closed, the operation in this column being identical to the operation set forth for the "Actual Balance" column with the exception that cam 264 will act to modify the total control to a subtotal control operation, as in the manner earlier set forth. At the completion of an operation in the "Zero Proof" column the carriage tabulates to the first "Checks" column of the ledger sheet. Here engagement of switch 756E will close the circuit over lead 815 to select the No. 5 amount and No. 5C counter registers for operation. Control from lead 814 of said switch is, however, at this time broken at contacts 786C of the operated relay 786. No register is called for by the mechanical program means and at the completion of the printing cycle controlled by the totalizing of the above registers the number of checks (3) recorded upon counter register No. 5C is printed along with the total amount (4150.00) of the checks entered. At the completion of the above printing cycle of operation the carriage tabulates to the second checks column. Here the switch 756F merely reconditions the circuit as for switch 756E and the operation in this column is as described for the first "Checks" column. However, the registers No. 5—5C having just been cleared only the usual .00 with total symbol is now printed and the carriage subsequently tabulates to the "Deposit" columnar position.

In this column switch 756G will close circuit over lead 816 to the control magnet 725C for the No. 6 amount and No. 6C counter registers, and again no mechanical program selection of registers will be made. The automatic totalizing operation and subsequent related machine cycle of operation now effects a printing of the number of deposits (1) recorded upon the account No. 6C register and the total amount (5000.00) of deposits recorded upon amount register No. 6. Following the above operation the carriage then tabulates to the "Actual Balance" column of the ledger sheet.

An automatic total in this column is effected purely for the purpose of subsequently tabulating the record carriage. So that the machine cycle may be effected an amount register No. 7 and the No. 8 counter register, previously cleared, will be called up for operation by closure of carriage operated switch 756H as follows.

Circuit from lead 817 of switch 756H has connection with one side of normally open contacts 786I of the relay switch 786. The opposite side of contacts 786I has circuit lead connection 867 with the magnet 725D for controlling selection of the heretofore inactive register No. 7, as in similar manner to that described for the other registers. The previously described operation of relay 786 having closed contacts 786I and also the switch 786B to the lead line 866 the above closure of switch 756H now effects selection of amount register No. 7 and counter register No. 8C for the totalizing operation.

Following the vertical total operation in the "Actual Balance" column the carriage will tabulate to the "Proof Balance" column and here also a totalizing operation merely prints the usual symbol indicating a cleared register and will thereafter tabulate the record carriage to the final or "Item" columnar position. For effecting the operation in the "Proof Balance" column register No. 3—3C is selected for a totalizing operation through extending ground circuit from the closed carriage switch 756I over lead 856 and normally closed contacts of switch 783G for energizing the control magnet 753 for the No. 3—3C register, as in the manner previously described. Throughout vertical total operations the contacts 786H of the relay 786 remain closed and any operation of the electromagnets 753, 725B or 725C will act upon closing the related switches 783G, 783B and 783C to extend ground circuit, over lead 787, for energizing the magnet 819 (see also FIG. 18) to release the total key lock slide 840 shown in FIG. 1. Said locking slide is operated also by selection of the No. 2 register in plus character of operations, relative to certain of the other columns, as by the mechanical program devices, in the manner earlier set forth.

The carriage following a tabulation from the "Proof Balance" to the "Item" columnar position will now come to rest and will remain in the latter said column, unless returned to the initial or "Account Number" columnar position following a manual restoration forwardly of the vertical total lever 385 coupled with an operation of motor key 114 for cycling the machine, the operation being as follows.

It is recalled that for the crossfooter posting series of operations certain control cams 200–200d act to cooperate with the roller 197 for controlling automatic return operations of the record carriage from various columnar positions. So that the carriage may automatically tabulate to each successive columnar position, through such columns during vertical total operations the rearward adjustment of vertical total lever 385 acts also to adjust the means earlier described in connection with FIG. 7 and which will disable the operations of the carriage return clutch means, as in the following manner.

The vertical total lever 385 has link connection 906 with a bail 907, loosely mounted upon shaft 908, and having a pin 909 underlying the cam edge 910 of the slide member 889, earlier described. Upon rearward movement of lever 385 bail 907 is rocked clockwise so that pin 909 engaging cam edge 910 moves the slide 889 upwardly, whereby projection 889' of said slide is positioned rearwardly of the end 323' to block engagement of the latch 323 with the pin 331 and thereby disabling the return clutch control means described earlier with relation to FIG. 8.

From the foregoing description it will be observed that in addition to the usual information printed upon the record forms there will now also be printed thereon the number of checks processed as well as the number of deposits and that a printed record is also obtained of the actual number of accounts (Activity Count) processed by the machine.

While one program of operation to which the devices are particularly adapted have been described herein it will be apparent that the control circuits may be modified for other programs. Also, other complete programs may be set up for control by additional switch elements 770 under control of the carriage, as for instance the series of contact switches adapted to be controlled by the roller 763' (FIG. 29) of the carriage. A suitable control switch 870 (FIGS. 1–1A) manually settable to selective control positions being provided to determine selection of the program to be active.

It will be recalled that to effect a total printing operation both an amount and a counter register must be active. It may be desired that a total stored upon the No. 1 register of the mechanical program control means is to be printed. Under such circumstances a selection of the No. 1 register by said means acts to effect a closure of the control switch 773 of the ground lead 772 to the contact side 871 of said switch, shown on the wiring diagram (FIG. 1A) whereby circuit is extended therefrom to the lead line 782 for energizing the magnet 725A, which controls the selection for the counter register No. 4C, for operation with the said No. 1 register, as in the manner described for the previous operations of said register.

While there have been shown and described and pointed out the fundamental novel features of the invention as applied to a preferred embodiment thereof, it will be understood that various omissions and substitutions and changes in the form and details of the devices illustrated and in their operations may be made by those skilled in the art, without departing from the spirit as indicated by the scope of the claims appended hereto.

I claim:

1. In a listing calculator or the like the combination comprising a shiftable record carriage, a plurality of amount registers, value actuators therefor having printing type displaceable therewith, cyclic operating means for said actuators, a mechanical program means operable in accordance with a predetermined columnar position of the record carriage for determining a selection and sign character of operation for said amount registers, a counter register having actuator means operable with the amount register actuators, electromagnetic program control devices including means adapted relative to said predetermined position of the record carriage to effect a selection of said counter register and to control an operation thereof in opposite sign character to the sign character of operation of the selected one of said amount registers, means normally conditioned ineffective of advancing the counter actuator a one-step movement, and sensing means controlled by the carriage in said predetermined columnar position and operable by the mechanical program devices for rendering the said counter advancing means effective.

2. In an apparatus of the class described, the combination of a group of amount registers including a support shaft for each one of said registers, counter registers each one mounted upon a corresponding support shaft for selected ones of the said amount registers, a counter register mounted upon a support shaft independent of any amount register, differentially adjustable actuators and associated printing type related in common to said amount registers, actuator and printing type adjacent thereto and related in common to all the said counter registers, cyclically operable means adapted for adjusting any said actuators and related printing type for the amount and counter registers to selected digit value positions and for effecting a printing operation of said printing type, clutch control means therefor, a record carriage movable to a plurality of columnar positions, program control means for selecting an amount and a counter register in accordance with the columnar position of said carriage, totalizing means, means on the carriage for effecting an automatic operation of said totalizing means relative to selective carriage positions and wherein said totalizing means is adapted for concomitantly zeroizing selective ones of said amount registers with selective ones of said counter registers whereby to adjust the respective printing types in accordance with values stored thereon, and means controlled jointly by a zeroizing of an amount register and a zeroizing of a counter register whereby to release the said clutch and effect operation of said cyclic operating means for a printing operation.

3. The invention according to claim 2 and including means normally blocking a printing movement of the printing type related to the counter registers, control means adapted for releasing said blocking means upon an operation of the totalizing means, means operable following the printing portion of said cycle to again reenable the said blocking means and means operable by a movement of the record carriage to selective columnar positions for superseding the said control of the blocking means effected by the totalizing means, whereby to assert the said blocking means and prevent operation of the counter printing type.

4. The invention according to claim 2 and having negative total control devices including means for controlling a plurality of machine cycles of operations in effecting the printing of a true negative total from an amount register, printing block means controlled by the said negative total devices for blocking a printing operation of the amount type during initial control cycles of machine operations and released for effecting a printing operation of said type in the final one of said control cycles of operation; blocking means normally preventing printing of the counter printing means, means for releasing said blocking means by an operation of the total taking means whereby a printing operation of the counter type is effected during a first control cycle for negative total operations, means operable subsequent to the said printing operation to reenable the said counter printing blocking means, a holding means conditioned by an operation of the total taking means and subsequently released therefrom by said operation of said reenabling means whereby to maintain the counter blocking means active to prevent printing during the subsequent control cycles of negative total operations, and means operable in a final one of said control cycles for releasing the said holding means.

5. In a machine of the class described the combination of a plurality of amount registers including a support shaft for each one of said registers, counter registers on preselected ones of said shafts, an activity counter register including a support shaft individual to any amount register, differentially movable actuators for said amount registers and said counter registers including printing type displaceable therewith, a record carriage displaceable for bringing selected columns of a record sheet opposite said printing type, a magnetic operating means for advancing the said activity counter in one-step movements, totalizing means in common to the amount and counter registers and adapted for displacing the respective actuators in accordance with values stored on said registers whereby to bring the corresponding value type to printing line position, electromagnetic means for effecting a register selection, circuit means therefor programmed in accordance with a preselected columnar position of the record carriage for determining an operation of a preselected one of said amount registers with a preselected one of said counter registers, means controlled by the carriage in a movement to said preselected columnar position for effecting an automatic totalizing operation of the said preselected registers, and circuit means for said magnetic operating means for said activity counter including a first control switch operated by movement of the record carriage to said preselected columnar position and a second control switch in series therewith and operable by the said totalizing means, whereby to cause the magnetic operating means to effect a unit count to the activity counter.

6. In an apparatus of the class described, means for programming a crossfooter posting series of operations to a customer's account including the combination of a plurality of counter registers, a plurality of amount registers including actuating means therefor, an actuating means for entering amounts into each counter register, cyclic operating means in common for all the said actuating means, electromagnetic counting means for a given one of said counter registers, a shiftable record carriage, mechanical program means including sensing means adapted in accordance with the columnar positions of the carriage for determining an operation of selective ones of said amount registers, electromagnetic program control means including a series of electromagnets and a plurality of control switches therefor spaced in accordance with predetermined columnar positions of the record carriage whereby to determine operations of other ones of said amount registers as in accordance with the columnar positions of the carriage and for determining an operation of selected ones of said counter registers in combination with the selected ones of said amount registers as preselected for operation in accordance with the columnar positions of the carriage, totalizing means for all the registers, means for effecting an automatic total taking operation upon movement of the carriage to a preselected columnar position, circuit means for said electromagnetic counting means including a first control switch adapted to be closed upon a positioning of the carriage to the said preselected column, a switch in series circuit with said first switch and operable by said operation of the total taking means to effect an energizing of the electromagnetic counting means, whereby to cause a one-step operation count upon the said special counter register incident to each crossfooter posting series of operations.

7. The invention according to claim 6 and having negative total control devices including means for controlling a plurality of machine control cycles of operations in effecting a printing of a true negative total from an amount register; and means controlled by said negative total devices for maintaining the said switch operated by the total taking means in closed circuit condition throughout said plurality of control cycles, whereby to maintain the said electromagnetic counting means in an operated condition following the said one-step operation count thereof and thereby prevent a multiplicity of counting operations to the said special register incident to said negative total control cycles of machine operations.

8. The invention according to claim 6 and having means for effecting a series of automatic vertical totals relative to the successive columns related to the crossfooter series of operations, including a manual control lever, means adjusted by an operation of said lever for modifying the program control of the said mechanical program means and for initiating a machine operation, a relay switch having a plurality of circuit contacts in series circuit with related ones of the said control switches for the registers controlled by the electromagnetic program means, a normally open circuit control switch for said relay adapted to be closed for energizing said relay upon said operation of said manual control lever whereby to adjust the said contacts thereof and thereby modify the circuit control of said control switches, and wherein successive operations of said control switches in accordance with a tabulation of the carriage to successive columnar positions will now effect a selection of the related amount and counter registers in accordance with said modified circuit control, and means under control of said lever whereby to cause an automatic total taking operation relative to the registers selected in accordance with said modified control for each of said successive columnar positions of the carriage.

9. The invention according to claim 8 and wherein said relay switch includes normally closed contact members in the circuit for said electromagnetic counting means, and wherein said operation of said relay switch will act to open said contact members whereby to prevent an operation of the said electromagnetic counting means during a vertical total series of operations.

10. The invention according to claim 8 and wherein said relay switch includes a normally open contact element in series circuit with a preselected one of said control switches related to a predetermined columnar position of the carriage and wherein said operation of said relay effects closure of said contact whereby to place said special register under control of the said preselected one of said control switches, and wherein operation of the carriage to said predetermined columnar position will cause a selection of said special register for engagement with the related actuating means for effecting a totalizing operation thereof during the said vertical total series of operations.

11. The invention according to claim 8 and having power return means for the record carriage, means for controlling automatic operations of said return means from selective positions of the record carriage during a crossfooter program series of operations, and means adjusted by the said operation of said manual control lever for disabling operations of the said power return means so that the carriage will tabulate to each successive columnar position during a series of vertical total operations.

12. In a listing calculator or the like the combination comprising a shiftable record carriage, a plurality of amount registers, value actuators therefor having printing type displaceable therewith, cyclic operating means for said actuators, a program means operable in accordance with a predetermined columnar position of the record carriage for determining a selection and sign character of operation for said amount registers, a counter register having actuator means operable with the amount register actuators, program control devices including means adapted relative to said predetermined position of the record carriage to effect a selection of said counter register and to control an operation thereof in opposite sign character to the sign character of operation of the selected one of said amount registers, means normally conditioned ineffective of advancing the counter actuator a one-step movement, and sensing means controlled by the carriage in said predetermined columnar position and operable by the amount register program devices for rendering the said counter advancing means effective.

13. In a listing calculator or the like the combination comprising a shiftable record carriage, a plurality of amount registers, value actuators therefor having printing type displaceable therewith, cyclic operating means for said actuators, a program means operable in accordance with a predetermined columnar position of the record carriage for determining a selection and sign character of operation for said amount registers, a counter register having actuator means operable with the amount register actuators, program control devices including means adapted relative to said predetermined position of the record carriage to effect a selection of said counter register and to control an operation thereof, means normally conditioned ineffective of advancing the counter actuator, and sensing means controlled by the carriage in said predetermined columnar position and operable by the amount register program devices for rendering the said counter advancing means effective.

14. In an apparatus of the class described, the combination of a group of amount registers including a support shaft for each one of said registers, counter registers each one mounted upon a corresponding support shaft for selected ones of the said amount registers, a counter register mounted upon a support shaft independent of any amount register, differentially adjustable actuators and associated printing type related in common to said amount registers, actuator and printing type adjacent thereto and related in common to all the said counter registers, cyclically operable means adapted for adjusting any said actuators and related printing type for the amount and counter registers to selected digit value positions and for effecting a printing operation of said printing type, clutch control means therefor, a record carriage movable to a plurality of columnar positions, program control means for selecting an amount and a counter register in accordance with the columnar position of said carriage, totalizing means, means controlled by the carriage for effecting an automatic operation of said totalizing means relative to selective carriage positions and wherein said totalizing means is adapted for concomitantly zeroizing selective ones of said amount registers with selective ones of said counter registers whereby to adjust the respective printing types in accordance with values stored thereon, and means controlled jointly by a zeroizing of an amount register and a zeroizing of a counter register whereby to release the said clutch and effect operation of said cyclic operating means for a printing operation.

No references cited.

UNITED STATES PATENT OFFICE
CERTIFICATE OF CORRECTION

Patent No. 3,021,054            February 13, 1962

James W. Dodsworth

It is hereby certified that error appears in the above numbered patent requiring correction and that the said Letters Patent should read as corrected below.

Column 2, line 41, after "to" insert -- the --; column 8, line 27, for "links" read -- link --; line 28, for "cam" read -- arm --; column 13, line 13, for "amounts" read -- amount --; column 17, line 75, for "copies" read -- copied --; column 21, line 26, for "hte" read -- the --; column 31, line 27, for "describe" read -- described --; column 34, line 40, for "termnate" read -- terminate --; column 35, lines 60 and 61, for "affecting" read -- effecting --.

Signed and sealed this 21st day of May 1963.

(SEAL)
Attest:

ERNEST W. SWIDER
Attesting Officer

DAVID L. LADD
Commissioner of Patents